US011395240B2

(12) United States Patent
Loehr et al.

(10) Patent No.: US 11,395,240 B2
(45) Date of Patent: *Jul. 19, 2022

(54) POWER CONTROL AND POWER HEADROOM REPORTING FOR DUAL CONNECTIVITY

(71) Applicant: Sun Patent Trust, New York, NY (US)

(72) Inventors: Joachim Loehr, Hessen (DE); Hidetoshi Suzuki, Kanagawa (JP); Prateek Basu Mallick, Hessen (DE)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/240,518

(22) Filed: Apr. 26, 2021

(65) Prior Publication Data
US 2021/0282094 A1 Sep. 9, 2021

Related U.S. Application Data

(63) Continuation of application No. 16/860,573, filed on Apr. 28, 2020, now Pat. No. 11,051,255, which is a (Continued)

(30) Foreign Application Priority Data

Sep. 27, 2013 (EP) .................................. 13186442

(51) Int. Cl.
*H04W 52/36* (2009.01)
*H04W 52/34* (2009.01)
(Continued)

(52) U.S. Cl.
CPC ......... *H04W 52/365* (2013.01); *H04W 52/34* (2013.01); *H04W 52/346* (2013.01); (Continued)

(58) Field of Classification Search
CPC ... H04W 52/365; H04W 52/34; H04W 52/36; H04W 52/346; H04W 76/27; H04W 52/367; H04W 52/242; H04W 84/045
See application file for complete search history.

(56) References Cited

U.S. PATENT DOCUMENTS 8,649,349 B2   2/2014  Wang
9,020,556 B2   4/2015  Haim et al.
(Continued)

FOREIGN PATENT DOCUMENTS

CN   102104905 A   6/2011
CN   102316569 A   1/2012
(Continued)

OTHER PUBLICATIONS

Ericsson, ST-Ericsson, "Physical layer aspects of dual connectivity," R1-133436, Agenda Item: 7.2.6.3, 3GPP TSG-RAN WG1 #74, Barcelona, Spain, Aug. 19-23, 2013, 3 pages.
(Continued)

*Primary Examiner* — Tuan H Nguyen
(74) *Attorney, Agent, or Firm* — Seed IP Law Group LLP

(57) ABSTRACT

The present disclosure relates to a method for efficiently performing power control in situations where the UE is connected to both a MeNB and SeNB. The MeNB determines a power distribution ratio for the power to be used by the UE for uplink transmission to the MeNB and SeNB, determines the parameters $P_{EMAX,MeNB}$ and $P_{EMAX,SeNB}$ and sends these parameters to the SeNB/UE for use in power control. Moreover, update of the power distribution ratio is performed by the MeNB with assistance by the UE, which provides the MeNB with information on the pathloss on the secondary radio link to the SeNB, preferably by transmitting a virtual power headroom report, regarding the secondary radio link to the SeNB, to the MeNB, from which the MeNB
(Continued)

derives the information on the pathloss for the secondary radio link.

4 Claims, 16 Drawing Sheets

Related U.S. Application Data continuation of application No. 16/267,974, filed on Feb. 5, 2019, now Pat. No. 10,681,655, which is a continuation of application No. 15/024,807, filed as application No. PCT/JP2014/004544 on Sep. 4, 2014, now Pat. No. 10,244,489.

(51) Int. Cl.
*H04W 76/27* (2018.01)
*H04W 52/24* (2009.01)
*H04W 84/04* (2009.01)

(52) U.S. Cl.
CPC ......... *H04W 52/367* (2013.01); *H04W 76/27* (2018.02); *H04W 52/242* (2013.01); *H04W 84/045* (2013.01)

(56) References Cited

U.S. PATENT DOCUMENTS

| | | | |
|---|---|---|---|
| 9,661,590 | B2 | 5/2017 | Haim et al. |
| 9,713,104 | B2 | 7/2017 | Zhao et al. |
| 2012/0178494 | A1 | 7/2012 | Haim |
| 2012/0182960 | A1 | 7/2012 | Wang |
| 2013/0010720 | A1 | 1/2013 | Lohr et al. |
| 2013/0016676 | A1 | 1/2013 | Lohr et al. |
| 2013/0100846 | A1 | 4/2013 | Park et al. |
| 2013/0188570 | A1 | 7/2013 | Zhao et al. |
| 2014/0329551 | A1 | 11/2014 | Ryoo et al. |
| 2015/0085760 | A1 | 3/2015 | Yamada et al. |
| 2015/0195797 | A1 | 7/2015 | Haim et al. |
| 2015/0365831 | A1 | 12/2015 | Ko et al. |
| 2016/0044611 | A1 | 2/2016 | Dai et al. |
| 2016/0066284 | A1* | 3/2016 | Kwon ............... H04W 72/0413 370/329 |
| 2016/0112961 | A1 | 4/2016 | Zhang et al. |
| 2016/0112966 | A1* | 4/2016 | Jung ..................... H04W 52/34 370/311 |
| 2016/0183290 | A1 | 6/2016 | Ko et al. |
| 2017/0223641 | A1 | 8/2017 | Haim et al. |

FOREIGN PATENT DOCUMENTS

| | | |
|---|---|---|
| CN | 103299690 A | 9/2013 |
| JP | 2013-520054 A | 5/2013 |
| WO | 2012/024338 A1 | 2/2012 |

OTHER PUBLICATIONS

3GPP TS 36.101 V8.7.0, "3$^{rd}$ Generation Partnership Project; Technical Specification Group Radio Access Network; Evolved Universal Terrestrial Radio Access (E-UTRA); User Equipment (UE) radio transmission and reception (Release 8)," Sep. 2009, 156 pages.
3GPP TS 36.133 V8.7.0, "3$^{rd}$ Generation Partnership Project; Technical Specification Group Radio Access Network; Evolved Universal Terrestrial Radio Access (E-UTRA); Requirements for support of radio resource management (Release 8)," Sep. 2009, 317 pages.
3GPP TS 36.211 V8.9.0, "3$^{rd}$ Generation Partnership Project; Technical Specification Group Radio Access Network; Evolved Universal Terrestrial Radio Access (E-UTRA); Physical Channels and Modulation (Release 8)," Dec. 2009, 83 pages.
3GPP TS 36.213 V8.8.0, 3$^{rd}$ Generation Partnership Project; Technical Specification Group Radio Access Network; Evolved Universal Terrestrial Radio Access (E-UTRA); Physical layer procedures (Release 8); Sep. 2009, 77 pages.
3GPP TS 36.321 V10.0.0, "3$^{rd}$ Generation Partnership Project; Technical Specification Group Radio Access Network; Evolved Universal Terrestrial Radio Access (E-UTRA); Medium Access Control (MAC) protocol specification (Release 10)," Dec. 2010, 53 pages.
3GPP TS 36.331 V11.4.0, "3$^{rd}$ Generation Partnership Project; Technical Specification Group Radio Access Network; Evolved Universal Terrestrial Radio Access (E-UTRA); Radio Resource Control (RRC); Protocol specification (Release 11)," Jun. 2013, 346 pages.
3GPP TR 36.842 V0.2.0, "3$^{rd}$ Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)," May 2013, 38 pages.
3GPP TR 36.932 V12.1.0, 3$^{rd}$ Generation Partnership Project; Technical Specification Group Radio Access Network; Evolved Universal Terrestrial Radio Access (E-UTRA); Scenarios and requirements for small cell enhancements for E-UTRA and E-UTRAN (Release 12); Mar. 2013, 14 pages.
Alcatel-Lucent, Alcatel-Lucent Shanghai Bell, "MAC and PHY modifications required for dual connectivity support," R2-131964, 3GPP TSG-RAN WG2 Meeting #82, Agenda Item: 7.2.1, Fukuoka, Japan, May 20-24, 2013, 4 pages.
ASUSTek, "Physical Layer Impacts of Dual Connectivity for Small Cell Enhancement," R1-133565, 3GPP TSG RAN WG1 Meeting #74, Agenda Item: 7.2.6.3, Barcelona, Spain, Aug. 19-23, 2013, 3 pages.
English translation of Search Report, which is an annex to Chinese Office Action, dated Jun. 4, 2018, for the related Chinese Patent Application No. 201480052571.8, 2 pages.
Extended European Search Report, dated Aug. 5, 2016, for corresponding EP Application No. 14849837.1-1855 / 3050369, 9 pages.
Extended European Search Report, dated Oct. 19, 2017, for corresponding EP Application No. 17193230.4-1875, 9 pages.
International Search Report dated Dec. 9, 2014, for corresponding International Application No. PCT/JP2014/004544, 2 pages.
Panasonic, "virtual power headroom report," R2-104502, 3GPP TSG-RAN WG2 #71, Agenda Item 7.1.1.6, Madrid, Spain, Aug. 23-27, 2010, 2 pages.
ZTE Corporation, "Discussion on UP common issues," R2-133146, 3GPP TSG-RAN2 #83bis, Agenda Item: 7.2.3, Ljubljana, Slovenia, Oct. 7-11, 2013, 5 pages.

* cited by examiner

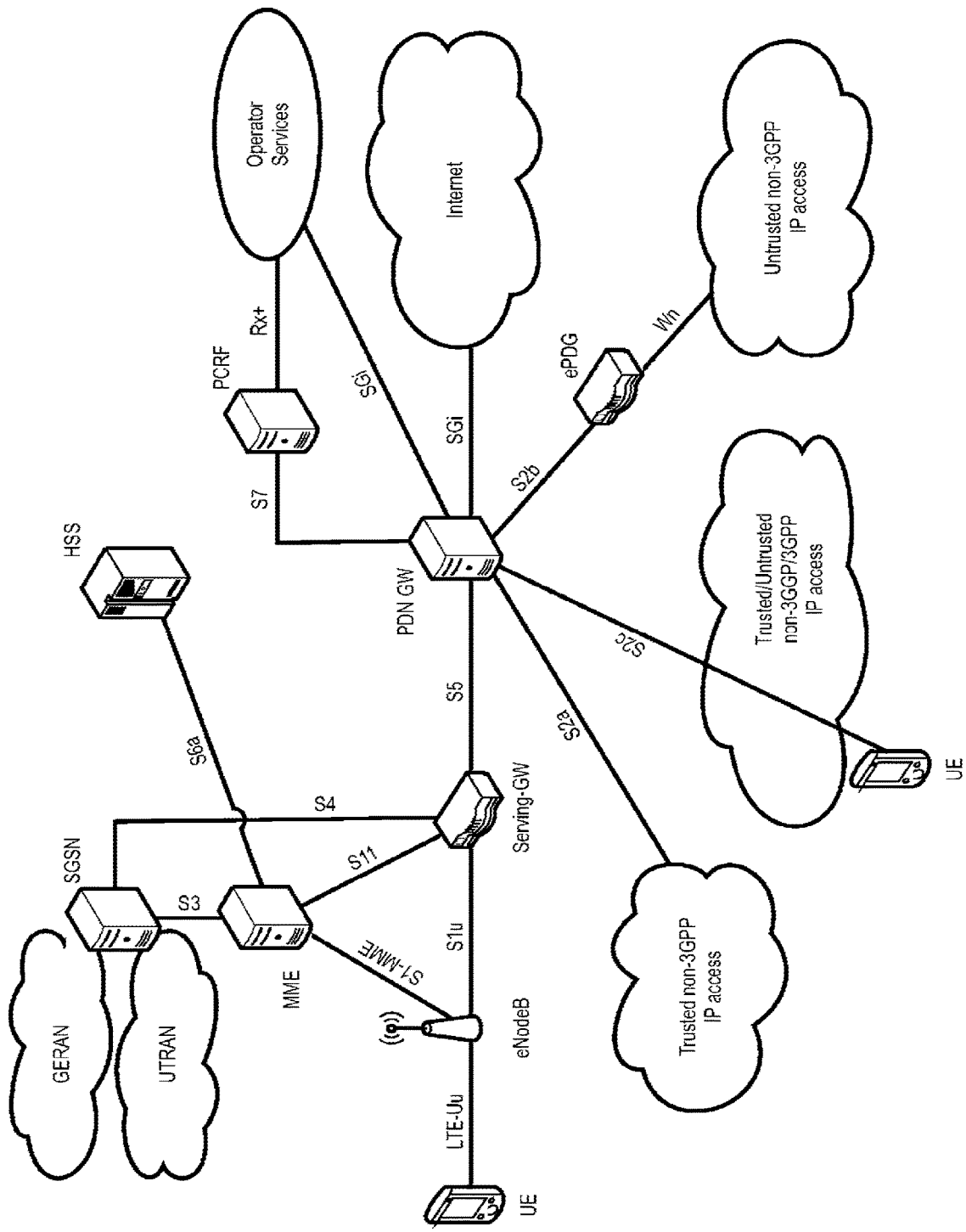
[Fig. 1]

[Fig. 2]
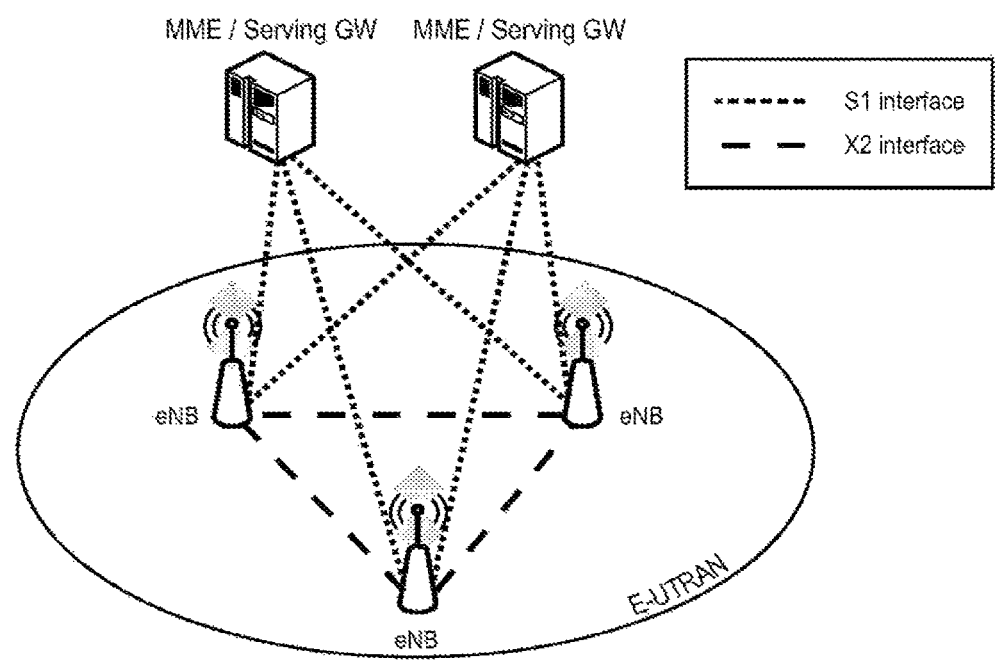

[Fig. 3]
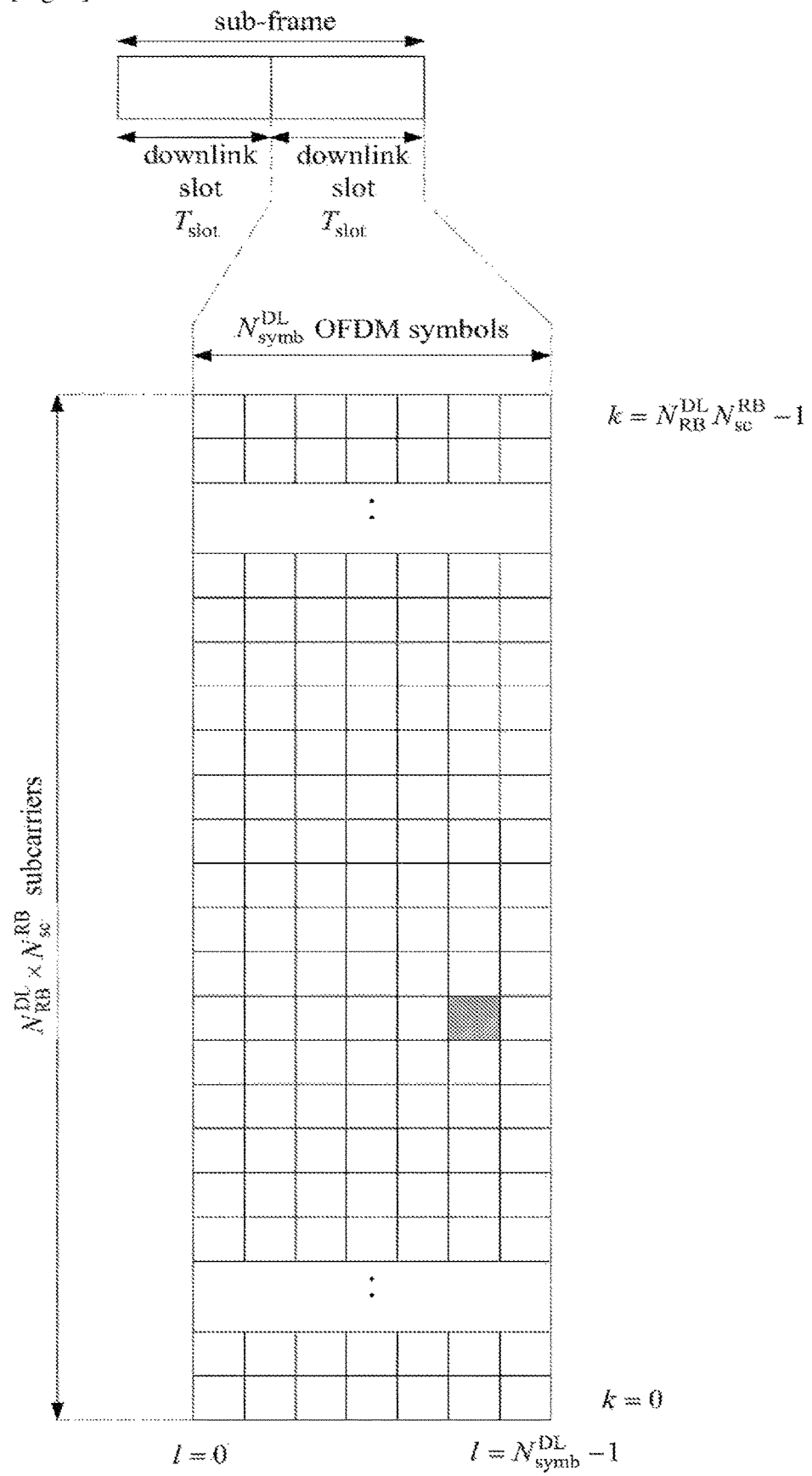

[Fig. 4]
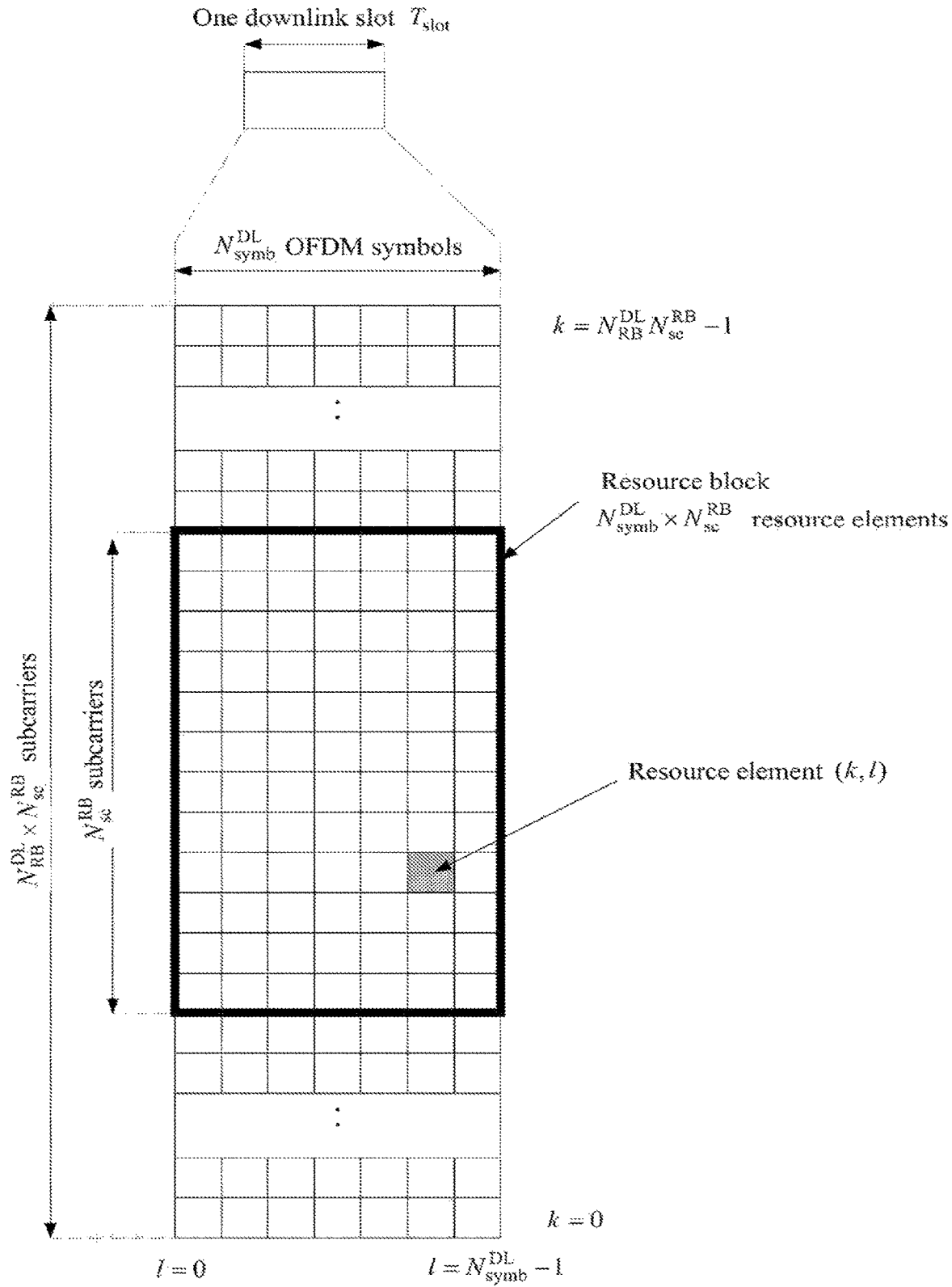

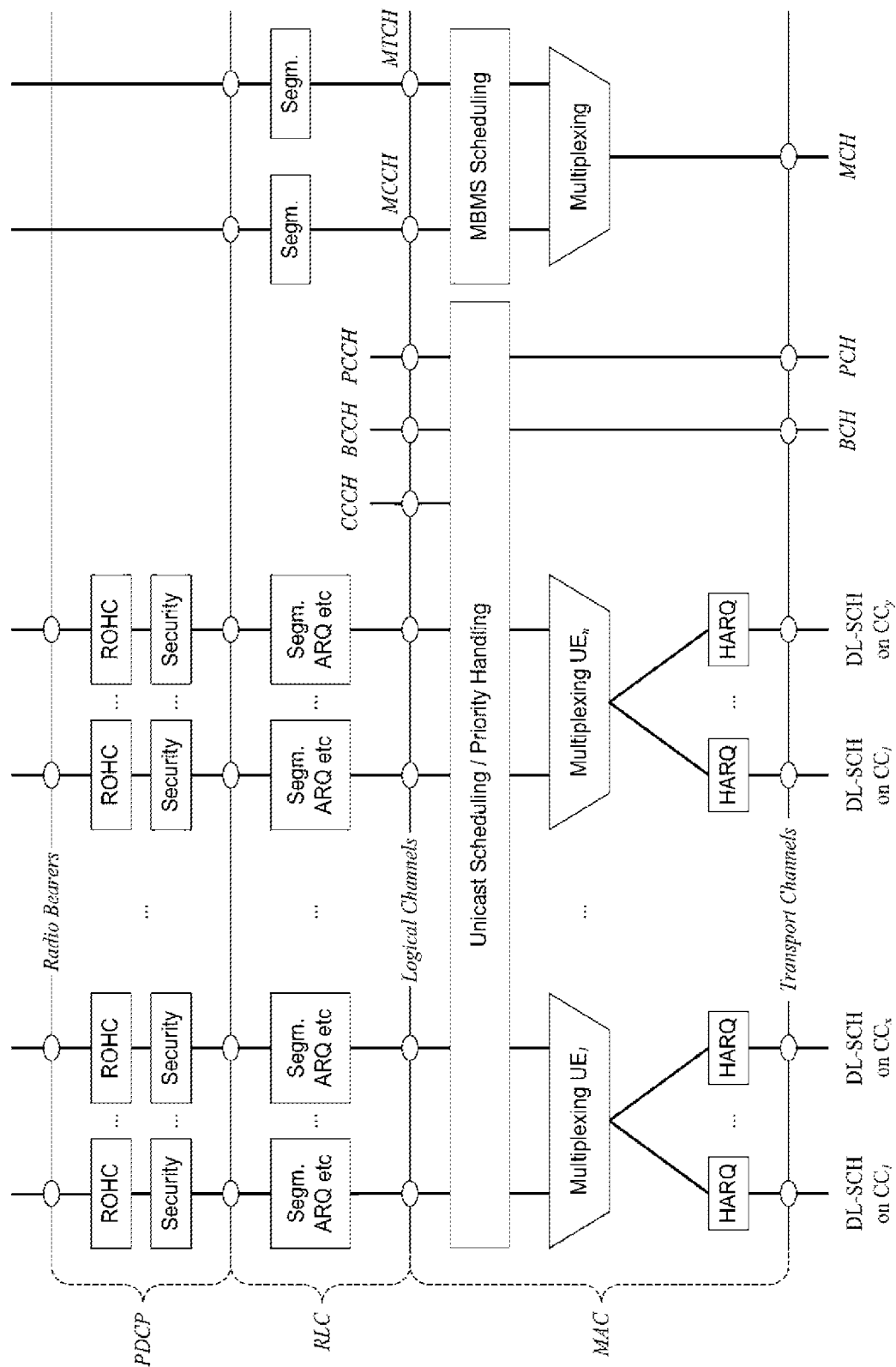
[Fig. 5]

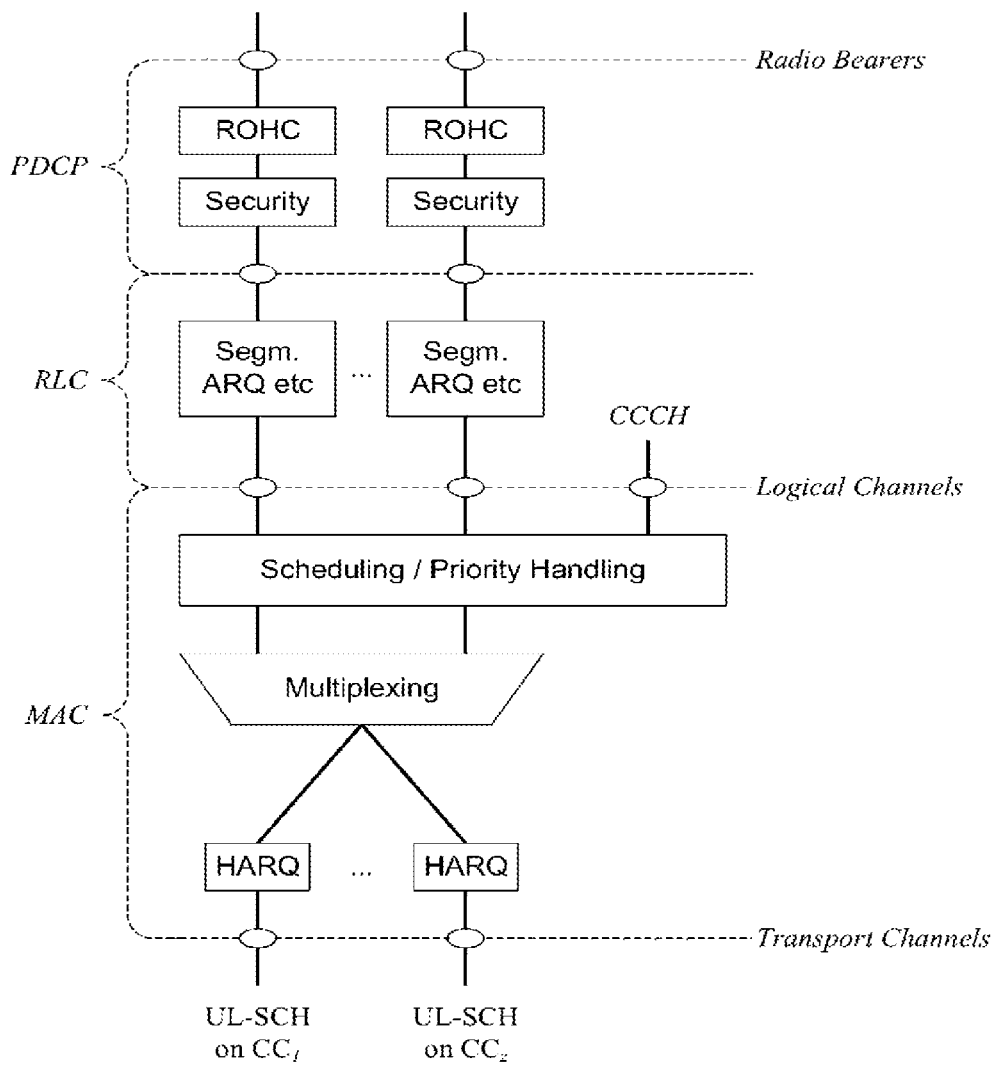
[Fig. 6]

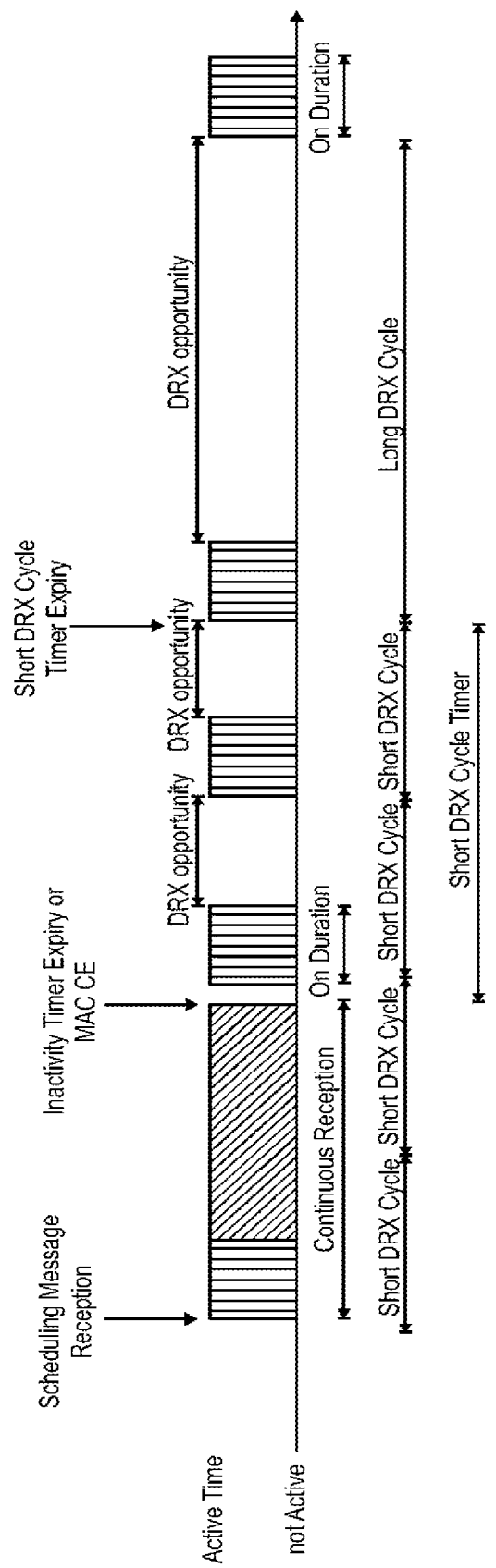
[Fig. 7]

[Fig. 8]
| $C_7$ | $C_6$ | $C_5$ | $C_4$ | $C_3$ | $C_2$ | $C_1$ | R | Oct1 |
|---|---|---|---|---|---|---|---|---|
[Fig. 9]
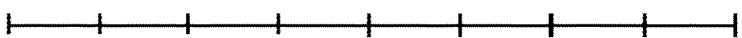
| $C_7$ | $C_6$ | $C_5$ | $C_4$ | $C_3$ | $C_2$ | $C_1$ | R |
|---|---|---|---|---|---|---|---|
| R | V | \multicolumn{6}{c}{PH (Type 2, PCell)} |
| R | R | \multicolumn{6}{c}{$P_{CMAX,c}$ 1} |
| R | V | \multicolumn{6}{c}{PH (Type 1, PCell)} |
| R | R | \multicolumn{6}{c}{$P_{CMAX,c}$ 2} |
| R | V | \multicolumn{6}{c}{PH (Type 1, Scell 1)} |
| R | R | \multicolumn{6}{c}{$P_{CMAX,c}$ 3} |
...
| R | V | PH (Type 1, Scell n) |
|---|---|---|
| R | R | $P_{CMAX,c}$ m |
[Fig. 10]
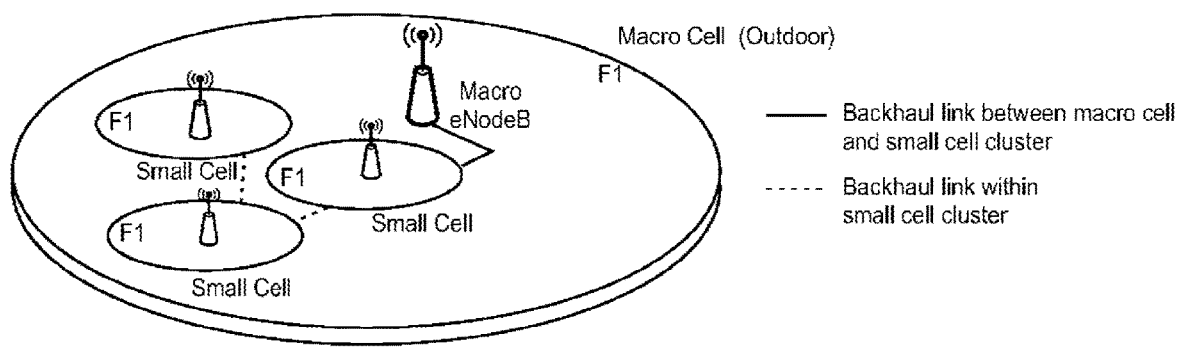

[Fig. 11]
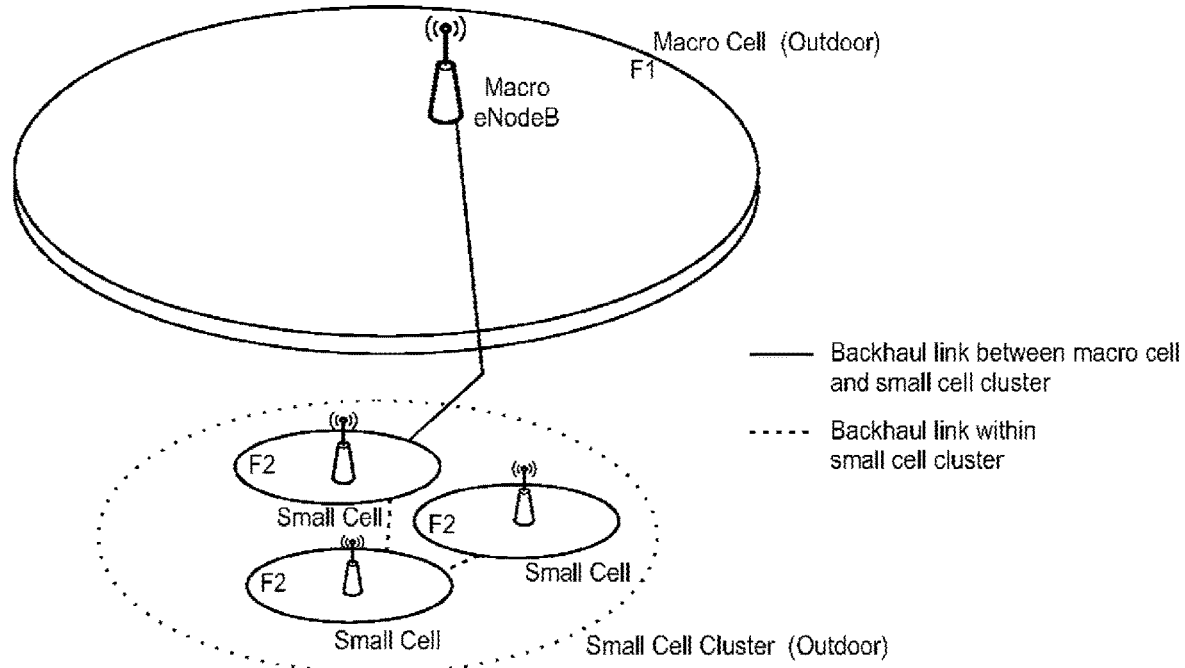
[Fig. 12]
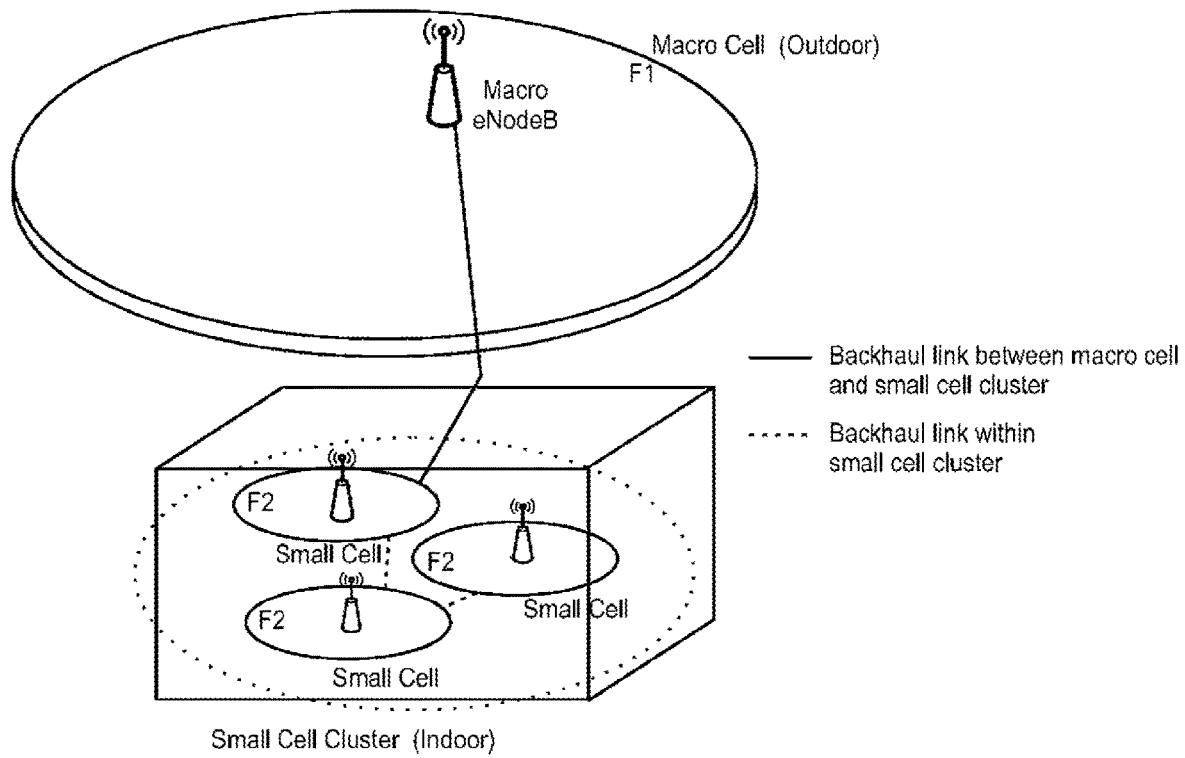

[Fig. 13]
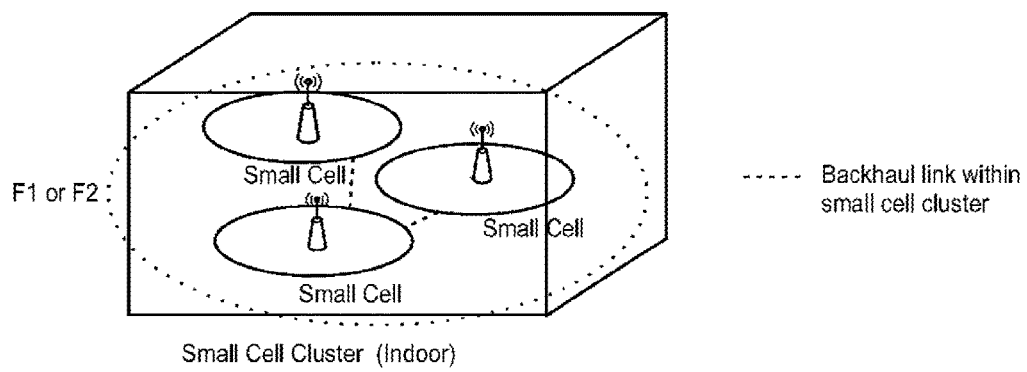
[Fig. 14]
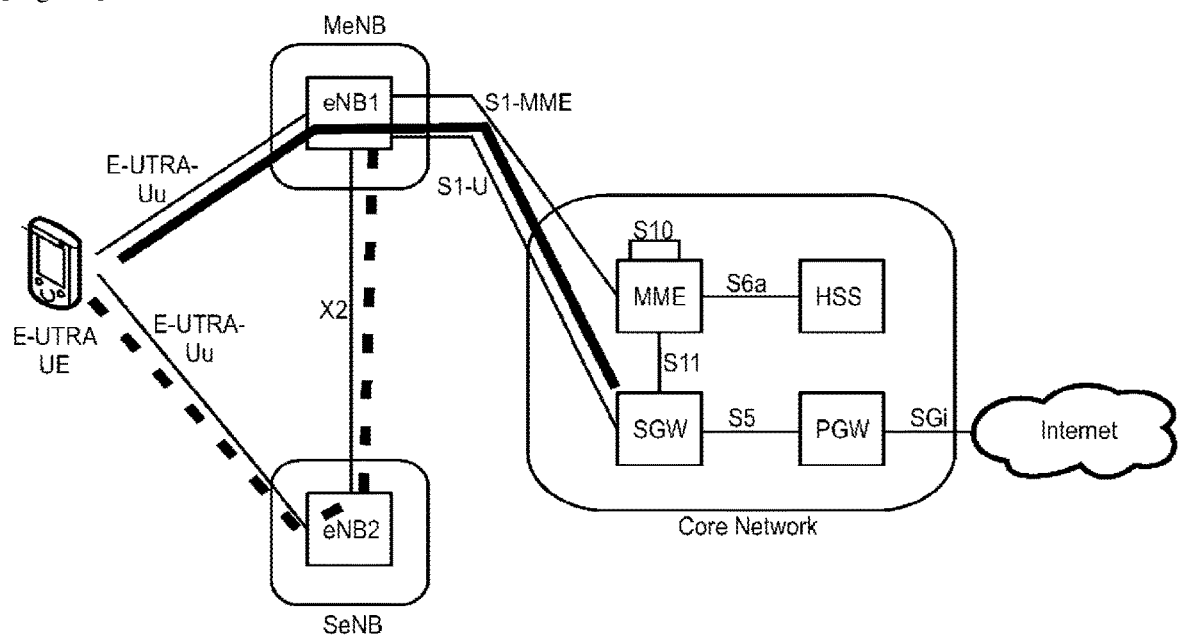

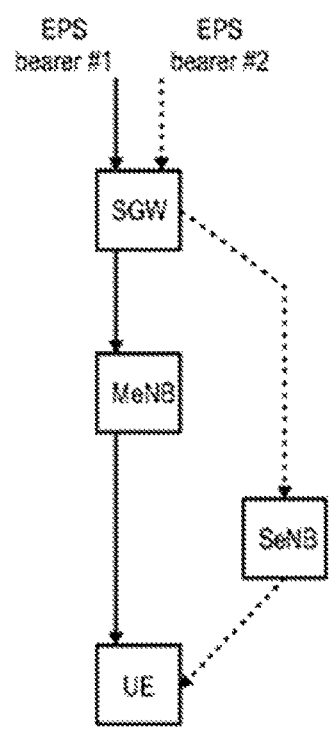 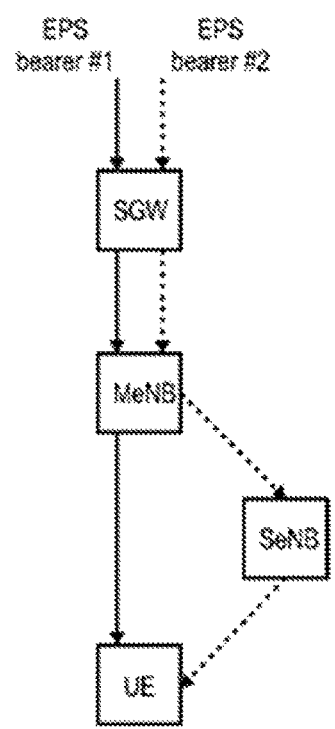 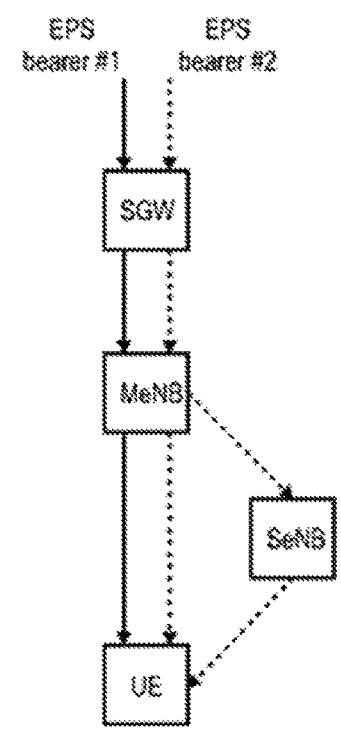
*FIG. 15a*  *FIG. 15b*  *FIG. 15c*

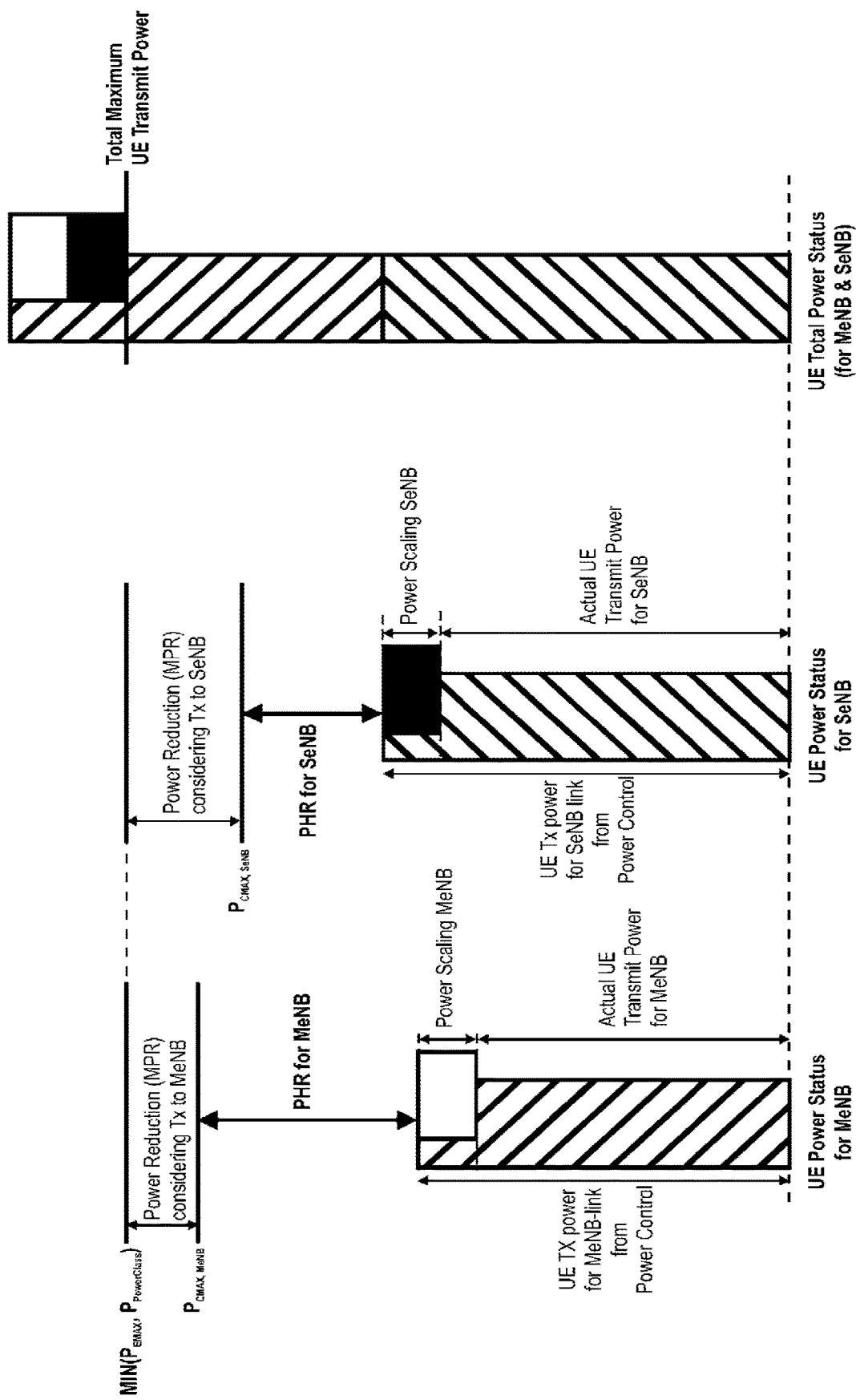

POWER CONTROL AND POWER HEADROOM REPORTING FOR DUAL CONNECTIVITY

BACKGROUND

Technical Field

The present disclosure relates to methods for an improved power headroom reporting and power distribution control. The present disclosure is also providing a mobile station and base stations for participating and for performing the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g., parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier (CC) of a 3GPP LTE system is subdivided in the time-frequency domain in so-called subframes. In 3GPP LTE each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consists of a number of modulation symbols transmitted on respective $N^{DL}_{RB} * N^{RB}_{sc}$ subcarriers as also shown in FIG. 4.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as $N^{DL}_{symb}$ consecutive OFDM symbols in the time domain (e.g., 7 OFDM symbols) and $N^{RB}_{sc}$ consecutive subcarriers in the frequency domain as exemplified in FIG. 4 (e.g., 12 subcarriers for a component carrier). In 3GPP LTE (Release 8), a physical resource block thus consists of $N^{DL}_{symb}*N^{RB}_{sc}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)" (NPL 1), section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same $N^{RB}_{sc}$ consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources. Similar assumptions for the component carrier structure apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers (cells) are aggregated in order to support wider transmission bandwidths up to 100 MHz. Several cells in the LTE system are aggregated into one wider channel in the LTE-Advanced system which is wide enough for 100 MHz even though these cells in LTE are in different frequency bands.

All component carriers can be configured to be LTE Rel. 8/9 compatible, at least when the aggregated numbers of component carriers in the uplink and the downlink are the same. Not all component carriers aggregated by a user equipment may necessarily be Rel. 8/9 compatible. Existing mechanism (e.g., barring) may be used to avoid Rel-8/9 user equipments to camp on a component carrier.

A user equipment may simultaneously receive or transmit one or multiple component carriers (corresponding to multiple serving cells) depending on its capabilities. A LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may not be possible to configure a mobile terminal with more uplink component carriers than downlink component carriers.

In a typical TDD deployment, the number of component carriers and the bandwidth of each component carrier in uplink and downlink is the same. Component carriers originating from the same eNodeB need not to provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n*300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). The characteristics of the downlink and uplink PCell are:

For each SCell the usage of uplink resources by the UE, in addition to the downlink ones is configurable; the number of DL SCCs configured is therefore always larger or equal to the number of UL SCCs, and no SCell can be configured for usage of uplink resources only.

The uplink PCell is used for transmission of Layer 1 uplink control information.

The downlink PCell cannot be de-activated, unlike SCells.

From UE perspective, each uplink resource only belongs to one serving cell.

The number of serving cells that can be configured depends on the aggregation capability of the UE.

Re-establishment is triggered when the downlink PCell experiences Rayleigh fading (RLF), not when downlink SCells experience RLF.

The downlink PCell cell can change with handover (i.e., with security key change and RACH procedure).

Non-access stratum information is taken from the downlink PCell.

PCell can only be changed with handover procedure (i.e., with security key change and RACH procedure).

PCell is used for transmission of PUCCH.

The configuration and reconfiguration of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover).

When a user equipment is configured with carrier aggregation there is one pair of uplink and downlink component carriers that is always active. The downlink component carrier of that pair might be also referred to as "DL anchor carrier". Same applies also for the uplink.

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking between uplink and downlink component carriers allows identifying the uplink component carrier for which the grant applies when there is no-cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Uplink Access scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and assumed improved coverage (higher data rates for a given terminal peak power). During each time interval, Node B assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (Node B), aided by insertion of a cyclic prefix in the transmitted signal.

The basic physical resource used for data transmission consists of a frequency resource of size $BW_{grant}$ during one time interval, e.g., a sub-frame of 0.5 ms, onto which coded information bits are mapped. It should be noted that a sub-frame, also referred to as transmission time interval (TTI), is the smallest time interval for user data transmission. It is however possible to assign a frequency resource $BW_{grant}$ over a longer time period than one TTI to a user by concatenation of sub-frames.

UL Scheduling Scheme for LTE

The uplink scheme allows for both scheduled access, i.e., controlled by eNB, and contention-based access.

In case of scheduled access, the UE is allocated a certain frequency resource for a certain time (i.e., a time/frequency resource) for uplink data transmission. However, some time/frequency resources can be allocated for contention-based access. Within these time/frequency resources, UEs can transmit without first being scheduled. One scenario where UE is making a contention-based access is for example the random access, i.e., when UE is performing initial access to a cell or for requesting uplink resources.

For the scheduled access Node B scheduler assigns a user a unique frequency/time resource for uplink data transmission. More specifically the scheduler determines which UE(s) is (are) allowed to transmit, which physical channel resources (frequency), Transport format (Modulation Coding Scheme (MCS)) to be used by the mobile terminal for transmission The allocation information is signaled to the UE via a scheduling grant, sent on the L1/L2 control channel. For simplicity reasons this channel is called uplink grant channel in the following. A scheduling grant message contains at least information which part of the frequency band the UE is allowed to use, the validity period of the grant, and the transport format the UE has to use for the upcoming uplink transmission. The shortest validity period is one sub-frame. Additional information may also be included in the grant message, depending on the selected scheme. Only "per UE" grants are used to grant the right to transmit on the UL-SCH (i.e., there are no "per UE per RB" grants). Therefore the UE needs to distribute the allocated resources among the radio bearers according to some rules. Unlike in HSUPA, there is no UE based transport format selection. The eNB decides the transport format based on some information, e.g., reported scheduling information and QoS info, and UE has to follow the selected transport format. In HSUPA the Node B assigns the maximum uplink resource, and UE selects accordingly the actual transport format for the data transmissions.

Since the scheduling of radio resources is the most important function in a shared channel access network for determining Quality of service, there are a number of requirements that should be fulfilled by the UL scheduling scheme for LTE in order to allow for an efficient QoS management.

Starvation of low priority services should be avoided.

Clear QoS differentiation for radio bearers/services should be supported by the scheduling scheme.

The UL reporting should allow fine granular buffer reports (e.g., per radio bearer or per radio bearer group) in order to allow the eNB scheduler to identify for which Radio Bearer/service data is to be sent.

It should be possible to make clear QoS differentiation between services of different users.

It should be possible to provide a minimum bit rate per radio bearer.

As can be seen from above list one essential aspect of the LTE scheduling scheme is to provide mechanisms with which the operator can control the partitioning of its aggregated cell capacity between the radio bearers of the different QoS classes. The QoS class of a radio bearer is identified by the QoS profile of the corresponding SAE bearer signaled from AGW to eNB as described before. An operator can then allocate a certain amount of its aggregated cell capacity to the aggregated traffic associated with radio bearers of a certain QoS class. The main goal of employing this class-based approach is to be able to differentiate the treatment of packets depending on the QoS class they belong to.

DRX (Discontinuous Reception)

DRX functionality can be configured for RRC_IDLE, in which case the UE uses either the specific or default DRX value (defaultPagingCycle); the default is broadcasted in the System Information, and can have values of 32, 64, 128 and 256 radio frames. If both specific and default values are available, the shorter value of the two is chosen by the UE. The UE needs to wake up for one paging occasion per DRX cycle, the paging occasion being one subframe.

DRX functionality can be also configured for an "RRC_CONNECTED" UE, so that it does not always need to monitor the downlink channels. In order to provide reasonable battery consumption of user equipment, 3GPP LTE (Release 8/9) as well as 3GPP LTE-A (Release 10) provides a concept of discontinuous reception (DRX). Technical Standard TS 36.321 (NPL 2) Chapter 5.7 explains the DRX and is incorporated by reference herein.

The following parameters are available to define the DRX UE behavior; i.e., the On-Duration periods at which the mobile node is active, and the periods where the mobile node is in a DRX mode.

On duration: duration in downlink sub-frames that the user equipment, after waking up from DRX, receives and monitors the PDCCH. If the user equipment successfully decodes a PDCCH, the user equipment stays awake and starts the inactivity timer; [1-200 subframes; 16 steps: 1-6, 10-60, 80, 100, 200]

DRX inactivity timer: duration in downlink sub-frames that the user equipment waits to successfully decode a PDCCH, from the last successful decoding of a PDCCH; when the UE fails to decode a PDCCH during this period, it re-enters DRX. The user equipment shall restart the inactivity timer following a single successful decoding of a PDCCH for a first transmission only (i.e., not for retransmissions). [1-2560 subframes; 22 steps, 10 spares: 1-6, 8, 10-60, 80, 100-300, 500, 750, 1280, 1920, 2560]

DRX Retransmission timer: specifies the number of consecutive PDCCH subframes where a downlink retransmission is expected by the UE after the first available retransmission time. [1-33 subframes, 8 steps: 1, 2, 4, 6, 8, 16, 24, 33]

DRX short cycle: specifies the periodic repetition of the on duration followed by a possible period of inactivity for the short DRX cycle. This parameter is optional. [2-640 subframes; 16 steps: 2, 5, 8, 10, 16, 20, 32, 40, 64, 80, 128, 160, 256, 320, 512, 640]

DRX short cycle timer: specifies the number of consecutive subframes the UE follows the short DRX cycle after the DRX Inactivity Timer has expired. This parameter is optional. [1-16 subframes].

Long DRX Cycle Start offset: specifies the periodic repetition of the on duration followed by a possible period of inactivity for the DRX long cycle as well as an offset in subframes when on-duration starts (determined by formula defined in TS 36.321 section 5.7); [cycle length 10-2560 subframes; 16 steps: 10, 20, 30, 32, 40, 64, 80, 128, 160, 256, 320, 512, 640, 1024, 1280, 2048, 2560; offset is an integer between [0—subframe length of chosen cycle]].

The total duration that the UE is awake is called "Active time". The Active Time includes the on-duration of the DRX cycle, the time UE is performing continuous reception while the inactivity timer has not expired and the time UE is performing continuous reception while waiting for a downlink retransmission after one HRQ RTT. Similarly, for the uplink the UE is awake at the subframes where uplink retransmission grants can be received, i.e., every 8 ms after initial uplink transmission until maximum number of retransmissions is reached. Based on the above, the minimum active time is of length equal to on-duration, and the maximum is undefined (infinite).

The operation of DRX gives the mobile terminal the opportunity to deactivate the radio circuits repeatedly (according to the currently active DRX cycle) in order to save power. Whether the UE indeed remains in DRX (i.e., is not active) during the DRX period may be decided by the UE; for example, the UE usually performs inter-frequency measurements which cannot be conducted during the On-Duration, and thus need to be performed some other time, during the DRX opportunity of time.

The parameterization of the DRX cycle involves a trade-off between battery saving and latency. For example, in case of a web browsing service, it is usually a waste of resources for a UE to continuously receive downlink channels while the user is reading a downloaded web page. On the one hand, a long DRX period is beneficial for lengthening the UE's battery life. On the other hand, a short DRX period is better for faster response when data transfer is resumed—for example when a user requests another web page.

To meet these conflicting requirements, two DRX cycles—a short cycle and a long cycle—can be configured for each UE; the short DRX cycle is optional, i.e., only the long DRX cycle is used. The transition between the short DRX cycle, the long DRX cycle and continuous reception is controlled either by a timer or by explicit commands from the eNodeB. In some sense, the short DRX cycle can be considered as a confirmation period in case a late packet arrives, before the UE enters the long DRX cycle. If data arrives at the eNodeB while the UE is in the short DRX cycle, the data is scheduled for transmission at the next on-duration time, and the UE then resumes continuous reception. On the other hand, if no data arrives at the eNodeB during the short DRX cycle, the UE enters the long DRX cycle, assuming that the packet activity is finished for the time being.

During the Active Time the UE monitors PDCCH, reports SRS (Sounding Reference Signal) as configured and reports CQI (Channel Quality Information)/PMI (Precoding Matrix Indicator)/RI (Rank Indicator)/PTI (Precoder Type Indication) on PUCCH. When UE is not in Active time, type-0-triggered SRS and CQI/PMI/RI/PTI on PUCCH may not be reported. If CQI masking is set up for the UE, the reporting of CQI/PMI/RI/PTI on PUCCH is limited to On Duration.

Available DRX values are controlled by the network and start from non-DRX up to x seconds. Value x may be as long as the paging DRX used in RRC_IDLE. Measurement requirements and reporting criteria can differ according to the length of the DRX interval, i.e., long DRX intervals may have more relaxed requirements (for more details see further below). When DRX is configured, periodic CQI reports can only be sent by the UE during "active-time". RRC can further restrict periodic CQI reports so that they are only sent during the on-duration.

FIG. 7 discloses an example of DRX. The UE checks for scheduling messages (indicated by its C-RNTI, cell radio network temporary identity, on the PDCCH) during the "on duration" period of either the long DRX cycle or the short DRX cycle depending on the currently active cycle. When a scheduling message is received during an "on duration", the UE starts an "inactivity timer" and monitors the PDCCH in every subframe while the Inactivity Timer is running. During this period, the UE can be regarded as being in a continuous reception mode. Whenever a scheduling message is received while the Inactivity Timer is running, the UE restarts the Inactivity Timer, and when it expires the UE moves into a short DRX cycle and starts a "short DRX cycle timer". The short DRX cycle may also be initiated by means of a MAC Control Element. When the short DRX cycle timer expires, the UE moves into a long DRX cycle.

In addition to this DRX behaviour, a "HARQ Round Trip Time (RTT) timer" is defined with the aim of allowing the UE to sleep during the HARQ RTT. When decoding of a downlink transport block for one HARQ process fails, the UE can assume that the next retransmission of the transport block will occur after at least "HARQ RTT" subframes. While the HARQ RTT timer is running, the UE does not need to monitor the PDCCH. At the expiry of the HARQ RTT timer, the UE resumes reception of the PDCCH as normal.

There is only one DRX cycle per user equipment. All aggregated component carriers follow this DRX pattern.

Uplink Power Control

Uplink transmission power control in a mobile communication system serves an important purpose: it balances the need for sufficient transmitted energy per bit to achieve the required Quality of Service (QoS) against the need to minimize interference to other users of the system and to maximize the battery life of the mobile terminal. In achieving this purpose, the role of the Power Control (PC) becomes decisive to provide the required SINR while controlling at the same time the interference caused to neighboring cells. The idea of classic PC schemes in uplink is that all users are received with the same SINR, which is known as full compensation. As an alternative, the 3GPP has adopted for LTE the use of Fractional Power Control (FPC). This new functionality makes users with a higher path-loss operate at a lower SINR requirement so that they will more likely generate less interference to neighboring cells.

Detailed power control formulae are specified in LTE for the Physical Uplink Shared Channel (PUSCH), Physical Uplink Control Channel (PUCCH) and the Sounding Reference Signals (SRSs) (for further details on the power control formulae, see for example 3GPP TS 36.213, "Evolved Universal Terrestrial Radio Access (E-UTRA); Physical layer procedures (Release 8)", version 8.8.0 (NPL 3) or 9.1.0, section 5.1, available at http://www.3gpp.org and incorporated herein by reference). The formula for each of these uplink signals follows the same basic principles; in all cases they can be considered as a summation of two main terms: a basic open-loop operating point derived from static or semi-static parameters signaled by the eNodeB, and a dynamic offset updated from subframe to subframe.

The basic open-loop operating point for the transmit power per resource block depends on a number of factors including the inter-cell interference and cell load. It can be further broken down into two components, a semi-static base level $P_0$, further comprised of a common power level for all user equipments in the cell (measured in dBm) and a UE-specific offset, and an open-loop path-loss compensation component. The dynamic offset part of the power per resource block can also be further broken down into two components, a component dependent on the MCS and explicit Transmitter Power Control (TPC) commands.

The MCS-dependent component (referred to in the LTE specifications as where $\Delta_{TF}$ stands for "Transport Format") allows the transmitted power per resource block to be adapted according to the transmitted information data rate.

The other component of the dynamic offset is the UE-specific TPC commands. These can operate in two different modes: accumulative TPC commands (available for PUSCH, PUCCH and SRS) and absolute TPC commands (available for PUSCH only). For the PUSCH, the switch between these two modes is configured semi-statically for each UE by RRC signaling, i.e., the mode cannot be changed dynamically. With the accumulative TPC commands, each TPC command signals a power step relative to the previous level.

Power Headroom Reporting

In order to assist the eNodeB to schedule the uplink transmission resources to different user equipments in an appropriate way, it is important that the user equipment can report its available power headroom to eNodeB.

The eNodeB can use the power headroom reports to determine how much more uplink bandwidth per sub-frame a user equipment is capable of using. This helps to avoid allocating uplink transmission resources to user equipments which are unable to use them in order to avoid a waste of resources.

The range of the power headroom report is from +40 to −23 dB (see 3GPP TS 36.133, "Requirements for support of radio resource management", version 8.7.0 (NPL 4), section 9.1.8.4, available at http//www.3gpp.org and incorporated in its entirety herein by reference). The negative part of the range enables the user equipment to signal to the eNodeB the extent to which it has received an UL grant which would require more transmission power than the UE has available. This would enable the eNodeB to reduce the size of a subsequent grant, thus freeing up transmission resources to allocate to other UEs.

A power headroom report can only be sent in sub-frames in which a UE has an UL transmission grant. The report relates to the sub-frame in which it is sent. The headroom report is therefore a prediction rather than a direct measurement; the UE cannot directly measure its actual transmission power headroom for the sub-frame in which the report is to be transmitted. It therefore relies on reasonably accurate calibration of the UE's power amplifier output.

A number of criteria are defined to trigger a power headroom report. These include:

A significant change in estimated path loss since the last power headroom report.

More than a configured time has elapsed since the previous power headroom report.

More than a configured number of closed-loop TPC commands have been implemented by the UE.

The eNodeB can configure parameters to control each of these triggers depending on the system loading and the requirements of its scheduling algorithm. To be more specific, RRC controls power headroom reporting by configuring the two timers "periodicPHR-Timer" and "prohibitPHR-Timer", and by signaling "dl-PathlossChange" which sets the change in measured downlink pathloss to trigger a power headroom report.

The power headroom report is send as a MAC Control Element. It consists of a single octet where the two highest bits are reserved and the six lowest bits represent the 64 dB values mentioned above in 1 dB steps. The structure of the MAC Control Element for the Rel-8 power headroom report is shown in FIG. 8.

The UE power headroom PH [dB] valid for sub-frame i is defined by the following equation (see section 5.1.1.2 of 3GPP TS 36.213):

$$PH(i)=P_{CMAX}-\{10\cdot\log_{10}(M_{PUSCH}(i))+P_{0\_PUSCH}(j)+a(j)+\Delta_{TF}(i)+f(i)\}$$ (Equation 1)

The power headroom is rounded to the closest value in the range [40; −23] dB with steps of 1 dB. $P_{CMAX}$ is the total maximum UE transmit power (or total maximum transmit power of the user equipment) and is a value chosen by the user equipment in the given range of $P_{CMAX\_L}$ and $P_{CMAX\_H}$ based on the following constraints:

$$P_{CMAX\_L} \leq P_{CMAX} \leq P_{CMAX\_H}$$

$$P_{CMAX\_L}=\min(P_{EMAX}-\Delta T_c, P_{PowerClass}-MPR-AMPR-\Delta T_c)$$

$$P_{CMAX\_H}=\min(P_{EMAX}, P_{PowerClass})$$

$P_{EMAX}$ is the value signaled by the network, and MPR, AMPR (also denoted as A-MPR) and $\Delta T_c$. are specified in 3GPP TS 36.101, "Evolved Universal Terrestrial Radio Access (E-UTRA); User Equipment (UE) radio transmission and reception", version 8.7.0 (NPL 5), section 6.2 available at http//www.3gpp.org and incorporated herein by reference.

MPR is a power reduction value, the so-called Maximum Power Reduction, used to control the Adjacent Channel Leakage Power Ratio (ACLR) associated with the various modulation schemes and the transmission bandwidth.

A-MPR is the additional maximum power reduction. It is band specific and it is applied when configured by the network. Therefore, $P_{CMAX}$ is UE implementation specific and hence not known by eNB.

Uplink Power Control for Carrier Aggregation

One main point of UL Power control for LTE-Advance is that a component carrier specific UL power control is supported, i.e., there will be one independent power control loop for each UL component carrier configured for the UE. Furthermore power headroom is reported per component carrier.

In Rel-10 within the scope of carrier aggregation there are two maximum power limits, a maximum total UE transmit power and a CC-specific maximum transmit power. RAN1 agreed at the RAN1 #60bis meeting that a power headroom report, which is reported per CC, accounts for the maximum power reduction (MPR). In other words, the power reduction applied by the UE is taken into account in the CC-specific maximum transmission power $P_{CMAX,c}$ (c denotes the component carrier). As already mentioned before, the purpose of MPR/A-MPR is to allow the mobile device to lower its maximum transmission power in order to be able to meet the requirements on signal quality, spectrum emission mask and spurious emissions.

As already mentioned before the purpose of values MPR/A-MPR is to allow the mobile device to lower its maximum transmission power in order to be able to meet the requirements on signal quality, spectrum emission mask and spurious emissions.

In addition to MPR and A-MPR in Release 10 the so called power management MPR, also referred to as P-MPR, was introduced in order to account for multi-RAT terminals which may have to limit their LTE total output power, particularly when simultaneous transmission on another RAT is taking place. Such power restrictions may arise, for example from regulations on Specific Absorption Rate (SAR) of radio energy into a user's body or from out-of-band emission requirements that may be affected by the inter-modulation products of the simultaneous radio transmissions. The P-MPR is not aggregated with MPR/A-MPR, since any reduction in a UE's maximum output power for the latter factor helps to satisfy the requirements that would have necessitated P-MPR.

Considering now the additional power management MPR (P-MPR), the UE configures its nominal maximum transmission power $P_{CMAX}$, i.e., the maximum transmission power available for the UE, according to the following equations:

$$P_{CMAX\_L} \leq P_{CMAX} \leq P_{CMAX\_H}$$

$$P_{CMAX\_L}=\text{MIN}\{P_{EMAX}-\Delta T_C, P_{PowerClass}-\max(\text{MPR}+A\text{-MPR}, P\text{-MPR})-\Delta T_C\}$$

$$P_{CMAX\_H}=\text{MIN}\{P_{EMAX}, P_{PowerClass}\}$$

For the case of carrier aggregation, the $P_{CMAX}$ becomes $P_{CMAX,c}$, the component-carrier specific maximum transmission power. Essentially the configured maximum output power on serving cell c shall be set within the following bounds:

$$P_{CMAX\_L,c} \leq P_{CMAX,c} \leq P_{CMAX\_H,c}$$

Two different deployments are to be considered, one where aggregated carriers are within the same frequency band, and also the case where carriers of different frequency bands are aggregated.

For intra-band contiguous carrier aggregation:

$$P_{CMAX\_L,c}=\text{MIN}\{P_{EMAX,c}-\Delta T_{C,c}, P_{PowerClass}-\text{MAX}(\text{MPR}_c+A\text{-MPR}_c, P\text{-MPR}_c)-\Delta T_{C,c}\}$$

For inter-band carrier aggregation:

$$P_{CMAX\_L,c}=\text{MIN}\{P_{EMAX,c}-\Delta T_{C,c}, P_{PowerClass}-\text{MAX}(\text{MPR}_c+A\text{-MPR}_c+\Delta T_{IB,c}, P\text{-MPR}_c)-\Delta T_{C,c}\}$$

$$P_{CMAX\_H,c}=\text{MIN}\{P_{EMAX,c}, P_{PowerClass}\}$$

$P_{EMAX,c}$ is the value given by IE P-Max for serving cell c in TS36.331

For inter-band carrier aggregation, $MPR_c$ and $A\text{-}MPR_c$ apply per serving cell c, i.e., there is a separate MPR and A-MPR per serving cell. For intra-band contiguous carrier aggregation, $MPR_c=MPR$, and $A\text{-}MPR_c=A\text{-}MPR$. $P\text{-}MPR_c$ accounts for power management for serving cell c. For intra-band contiguous carrier aggregation, there is one power management term for the UE, P-MPR, and $P\text{-}MPR_c=P\text{-}MPR$.

For carrier aggregation with two UL serving cells, the total configured maximum output power $P_{CMAX}$ shall be set within the following bounds:

$$P_{CMAX\_L\_CA} \leq P_{CMAX} \leq P_{CMAX\_H\_CA}$$

For intra-band contiguous carrier aggregation, $$P_{CMAX\_L,CA} = \text{MIN}\{10 \cdot \log_{10} \Sigma p_{EMAX,c} - \Delta T_C, P_{PowerClass} - \text{MAX}(\text{MPR} + A\text{-MPR} + \Delta T_{IB,c}, P\text{-MPR}) - \Delta T_C\}$$

$$P_{CMAX\_H\_CA} = \text{MIN}\{10 \cdot \log_{10} \Sigma p_{EMAX,c}, P_{PowerClass}\}$$

where $p_{EMAX,c}$ is the linear value of $P_{EMAX,c}$ which is given by RRC signaling (for details see TS 36.331 incorporated herein by reference).

For inter-band carrier aggregation with up to one serving cell c per operating band:

$$P_{CMAX\_L,CA} = \text{MIN}\{10 \cdot \log_{10} \Sigma \text{ MIN}[p_{EMAX,c}/(\Delta t_{C,c}), p_{PowerClass}/(\text{mpr}_c \cdot a\text{-mpr}_c \cdot \Delta t_{C,c} \cdot \Delta t_{IB,c}), p_{PowerClass}/(p\text{-mpr}_c \cdot \Delta t_{C,c})], P_{PowerClass}\}$$

$$P_{CMAX\_H\_CA} = \text{MIN}\{10 \cdot \log_{10} \Sigma p_{EMAX,c}, P_{PowerClass}\}$$

where $p_{EMAX,c}$ is the linear value of $P_{EMAX,c}$ which is given by TS 36.331. $\text{MPR}_c$ and $\text{A-MPR}_c$ apply per serving cell c and are specified in subclause 6.2.3 and subclause 6.2.4 of TS36.101, respectively, also incorporated herein by reference. $\text{mpr}_c$ is the linear value of $\text{MPR}_c$. $\text{a-mpr}_c$ is the linear value of $\text{A-MPR}_c$. $\text{P-MPR}_c$ accounts for power management for serving cell c. $\text{p-mpr}_c$ is the linear value of $\text{P-MPR}_c$.

Further information about the definition of CC-specific maximum transmission power respectively the UE total maximum transmission power can be found in TS36.101, incorporated herein by reference.

Different to Rel-8/9 for LTE-A the UE has also to cope with simultaneous PUSCH-PUCCH transmission, multi-cluster scheduling, and simultaneous transmission on multiple CCs, which requires larger MPR values and also causes a larger variation of the applied MPR values compared to Rel-8/9.

It should be noted that the eNB does not have knowledge of the power reduction applied by the UE on each CC, since the actual power reduction depends on the type of allocation, the standardized MPR value and also on the UE implementation. Therefore, the eNB does not know the CC-specific maximum transmission power relative to which the UE calculates the PHR. In Rel-8/9 for example UE's maximum transmit power $P_{CMAX}$ can be within some certain range as described above.

$$P_{CMAX\_L} \leq P_{CMAX} \leq P_{CMAX\_H}$$

Due to the fact that the power reduction applied by the UE to the maximum transmit power of a CC is not known by eNB it was agreed to introduce in Rel-10 a new power headroom MAC control element, which is also referred to as extended power headroom MAC control element. The main difference to the Rel-8/9 PHR MAC CE format, is that it includes a Rel-8/9 power headroom value for each activated UL CC and is hence of variable size. Furthermore it not only reports the power headroom value for a CC but also the corresponding $P_{CMAX,c}$ (maximum transmit power of CC with the index c) value. In order to account for simultaneous PUSCH-PUCCH transmissions, UE reports for PCell the Rel-8/9 power headroom value which is related to PUSCH only transmissions (referred to type 1 power headroom) and if the UE is configured for simultaneous PUSCH-PUCCH transmission, a further Power headroom value, which considers PUCCH and PUSCH transmissions, also referred to as type 2 power headroom.

In order to be able to distinguish at the eNB side whether the maximum transmission power was reduced due to MPR/A-MPR power reduction or caused by applying a P-MPR, a one bit indicator, also referred to as P-bit, was introduced in the extended power headroom MAC CE. More in particular the UE sets P=1 if the corresponding maximum transmission power ($P_{CMAX,c}$) would have had a different value if no power backoff due to power management (P-MPR) had been applied. Essentially this P bit is used by the eNB to remove the PHR reports, which are affected by P-MPR, from the MPR-learning algorithm in the eNB, i.e., eNB stores in an internal table which MPR value the UE uses for certain resource allocations.

For further details on the extended power headroom MAC Control element illustrated in FIG. 9, see for example 3GPP TS 36.321, "Evolved Universal Terrestrial Radio Access (E-UTRA); Medium Access Control (MAC) protocol specification (Release 10)", version 10.0.0 (NPL 2), section 6.1.3.6a, available at http://www.3gpp.org and incorporated herein by reference.

Type-1 power headroom can also be reported for sub-frames where there is no actual PUSCH transmission. This special PHR is also referred to as virtual PHR. In such cases, $10 \log_{10}(M_{PUSCH}(i))$ and $\Delta_{TF,c}(i)$ in the expression of the power headroom report shown above are set to zero. Values for the pathloss (PL), received TPC commands f(i) and other CC specific constants ($P_{0\_PUSCH}(j)$, a) are available for the UL CC, even without UL data transmission:

$$\text{PH}_{virtual,c(i)} = P_{CMAX,H,c} - \{P_{0\_PUSCH}(j) + a(j) + \text{PL}_c + f(i)\}$$

This can be seen as the power headroom assuming a default transmission configuration corresponding to the minimum possible resource assignment (M=1) and the modulation-and-coding scheme associated with $\Delta_{TF,c}(i)=0$ dB. The carrier-specific maximum transmission power $\tilde{P}_{CMAX,c}(i)$ is computed assuming MPR=0 dB
A-MPR=0 dB
P-MPR=0 dB
$\Delta T_c$=0 dB.

Essentially, $\tilde{P}_{CMAX,c}(i)$ is equal to $P_{CMAX\_H,c} = \text{MIN}\{P_{EMAX,c}, P_{PowerClass}\}$.

Similar to Type-1 power headroom reporting, the Type-2 power headroom can also be reported for subframes in which no PUSCH and/or PUCCH is transmitted. In that case a virtual PUSCH and/or PUCCH transmit power is calculated, assuming the smallest possible resource assignment (M=1) and $\Delta\text{MCS}$=0 dB for PUSCH and $h(n_{CQI}, n_{HARQ}, n_{SR})$, $\Delta_{F\_PUCCH}(F)$, $\Delta_{TxD}(F')$ set to 0 for PUCCH. Further details about the computation of power headroom can be found in TS36.213, incorporated herein by reference.

Small Cells

Explosive demands for mobile data are driving changes in how mobile operators will need to respond to the challenging requirements of higher capacity and improved Quality of user Experience (QoE). Currently, fourth generation wireless access systems using Long Term Evolution (LTE) are being deployed by many operators worldwide in order to offer faster access with lower latency and more efficiency than 3G/3.5G system. Nevertheless, the anticipated future traffic growth is so tremendous that there is a vastly increased need for further network densification to handle the capacity requirements, particularly in high traffic areas (hot spot areas) that generate the highest volume of traffic. Network densification—increasing the number of network nodes, thereby bringing them physically closer to the user terminals—is a key to improving traffic capacity and extending the achievable user-data rates of a wireless communication system.

In addition to straightforward densification of a macro deployment, network densification can be achieved by the deployment of complementary low-power nodes respectively small cells under the coverage of an existing macro-node layer. In such a heterogeneous deployment, the low-power nodes provide very high traffic capacity and very high user throughput locally, for example in indoor and outdoor hotspot positions. Meanwhile, the macro layer ensures service availability and QoE over the entire coverage area. In other words, the layer containing the low-power nodes can also be referred to as providing local-area access, in contrast to the wide-area-covering macro layer.

The installation of low-power nodes respectively small cells as well as heterogeneous deployments has been possible since the first release of LTE. In this regard, a number of solutions have been specified in recent releases of LTE (i.e., Release-10/11). More specifically, these releases introduced additional tools to handle inter-layer interference in heterogeneous deployments. In order to further optimize performance and provide cost/energy-efficient operation, small cells require further enhancements and in many cases need to interact with or complement existing macro cells. Such solutions will be investigated during the further evolution of LTE-Release 12 and beyond. In particular further enhancements related to low-power nodes and heterogeneous deployments will be considered under the umbrella of the new Rel-12 study item (SI) "Study on Small Cell Enhancements for E-UTRA and E-UTRAN". Some of these activities will focus on achieving an even higher degree of interworking between the macro and low-power layers, including different forms of macro assistance to the low-power layer and dual-layer connectivity. Dual connectivity implies that the device has simultaneous connections to both macro and low-power layers.

Some deployment scenarios assumed in this study item on small cell enhancements will be discussed below. In the following scenarios, the backhaul technologies categorized as non-ideal backhaul in TR 36.932 are assumed.

Both ideal backhaul (i.e., very high throughput and very low latency backhaul such as dedicated point-to-point connection using optical fiber) and non-ideal backhaul (i.e., typical backhaul widely used in the market such as xDSL, microwave, and other backhauls like relaying) should be studied. The performance-cost trade-off should be taken into account.

A categorization of non-ideal backhaul based on operator inputs is listed in the table below:

TABLE 1

| Backhaul Technology | Latency (One way) | Throughout | Priority (1 is the highest) |
|---|---|---|---|
| Fiber Access 1 | 10-30 ms | 10M-10 Gbps | 1 |
| Fiber Access 2 | 5-10 ms | 100-1000 Mbps | 2 |
| Fiber Access 3 | 2-5 ms | 50M-10 Gbps | 1 |
| DSL Access | 15-60 ms | 10-100 Mbps | 1 |
| Cable | 25-35 ms | 10-100 Mbps | 2 |
| Wireless Backhaul | 5-35 ms | 10 Mbps-100 Mbps typical, maybe up to Gbps range | 1 |

Fiber access which can be used to deploy Remote Radio Heads (RRHs) is not assumed in this study. HeNBs are not precluded, but not distinguished from Pico eNBs in terms of deployment scenarios and challenges even though the transmission power of HeNBs is lower than that of Pico eNBs. The following 3 scenarios are considered.

Scenario #1 is illustrated in FIG. 10 and is the deployment scenario where macro and small cells on the same carrier frequency (intra-frequency) are connected via a non-ideal backhaul. User are distributed both for outdoor and indoor.

Scenario #2 is illustrated in FIGS. 11 and 12 and refers to a deployment scenario where macro and small cells on different carrier frequencies (inter-frequency) are connected via a non-ideal backhaul. User are distributed both for outdoor and indoor. There are essentially two different scenarios #2, referred herein as 2a and 2b, the difference being that in scenario 2b an indoor small cell deployment is considered.

Scenario #3 is illustrated in FIG. 13 and refers to a deployment scenario where only small cells on one or more carrier frequencies are connected via a non-ideal backhaul link.

Depending on the deployment scenario, different challenges/problems exist which need to be further investigated. During the study item phase such challenges have been identified for the corresponding deployment scenarios and captured in TS 36.842; more details on those challenges/problems can be found there.

In order to resolve the identified challenges which are described in section 5 of TS36.842, the following design goals are taken into account for this study in addition to the requirements specified in TR 36.932.

In terms of mobility robustness:

For UEs in RRC_CONNECTED, Mobility performance achieved by small cell deployments should be comparable with that of a macro-only network.

In terms of increased signaling load due to frequent handover:

Any new solutions should not result in excessive increase of signaling load towards the Core Network. However, additional signaling and user plane traffic load caused by small cell enhancements should also be taken into account.

In terms of improving per-user throughput and system capacity:

Utilizing radio resources across macro and small cells in order to achieve per-user throughput and system capacity similar to ideal backhaul deployments while taking into account QoS requirements should be targeted.

Dual Connectivity

One promising solution to the problems which are currently under discussion in 3GPP RAN working groups is the so-called "dual connectivity" concept. The term "dual connectivity" is used to refer to an operation where a given UE consumes radio resources provided by at least two different network nodes connected via a non-ideal backhaul. Essentially, the UE is connected with both a macro cell (macro eNB) and small cell (secondary or small eNB). Furthermore, each eNB involved in dual connectivity for a UE may assume different roles. Those roles do not necessarily depend on the eNB's power class and can vary among UEs.

Since the study item is currently at a very early stage, details on dual connectivity are not decided yet. For example the architecture has not been agreed on yet. Therefore, many issues/details, e.g., protocol enhancements, are still open currently. FIG. 14 shows an exemplary architecture for dual connectivity. It should be only understood as one potential option; the present disclosure is not limited to this specific network/protocol architecture but can be applied generally. The following assumptions on the architecture are made here:

Per bearer level decision where to serve each packet, C/U plane split. As an example UE RRC signaling and high QoS data such as VoLTE can be served by the Macro cell, while best effort data is offloaded to the small cell.

No coupling between bearers, so no common PDCP or RLC required between the Macro cell and small cell.

Looser coordination between RAN nodes.

SeNB has no connection to S-GW, i.e., packets are forwarded by MeNB.

Small Cell is transparent to CN.

Regarding the last two bullet points, it should be noted that it's also possible that SeNB is connected directly with the S-GW, i.e., S1-U is between S-GW and SeNB. Essentially, there are three different options w.r.t. the bearer mapping/splitting:

Option 1: S1-U also terminates in SeNB; depicted in FIG. 15a

Option 2: S1-U terminates in MeNB, no bearer split in RAN; depicted in FIG. 15b

Option 3: S1-U terminates in MeNB, bearer split in RAN; depicted in FIG. 15c

FIGS. 15a-c depict those three options taking the downlink direction for the U-Plane data as an example. For explanation purposes, option 2 is mainly assumed for this application, and is the basis for FIG. 14 too.

In addition to the discussion on the splitting of the U-plane data as depicted in FIGS. 15a-c, different alternatives have been discussed for the user plane architecture too.

A common understanding is that, when the S1-U interface terminates at the MeNB (FIG. 15b,c), the protocol stack in the SeNB must at least support RLC (re-)segmentation. This is due to the fact that RLC (re-)segmentation is an operation that is tightly coupled to the physical interface (e.g., MAC layer indicating size of the RLC PDU, see above), and when a non-ideal backhaul is used, RLC (re-)segmentation must take place in the same node as the one transmitting the RLC PDUs.

Shortcomings of Prior Art Power Control

As explained in the previous sections, small cells and dual connectivity are a recent development and still pose several problems that need to be addressed in order to allow for an efficient system.

In the dual connectivity scenarios as explained above simultaneous uplink transmissions by the UE to both the MeNB and SeNB (also referred to as dual Tx) are supported for Release 12. There are two independent schedulers, one residing in the MeNB and the other one residing in the SeNB, which each schedule uplink transmission for the UE independently from one another. More in particular, uplink resource allocations scheduled in one cell are not known in the other cell. In other words, the MeNB scheduler is not aware of uplink scheduling decisions made by the SeNB, and vice versa.

For said reason, there is an increased probability that the UE will be power limited, i.e., that the UE total maximum transmission power is exceeded when two uplink transmission are scheduled with too much power.

This is illustrated in FIG. 16, which shows a power-limited situation where two uplink transmissions are scheduled for the UE, one to the MeNB and one to the SeNB. As apparent therefrom, the simultaneous uplink transmissions exceed to the total maximum UE transmit power, for which reasons power scaling is performed by the UE for the uplink transmissions so as to keep the total power used for the two transmissions below the total maximum UE transmit power. Power scaling in turn reduces the scheduling efficiency and performance.

CITATION LIST

Non Patent Literature

NPL 1

3GPP TS 36.211, "Evolved Universal Terrestrial Radio Access (E-UTRA); Physical Channels and Modulation", version 8.9.0

NPL 2

3GPP TS 36.321, "Evolved Universal Terrestrial Radio Access (E-UTRA); Medium Access Control (MAC) protocol specification", version 10.0.0

NPL 3

3GPP TS 36.213, "Evolved Universal Terrestrial Radio Access (E-UTRA); Physical layer procedures", version 8.8.0

NPL 4

3GPP TS 36.133, "Requirements for support of radio resource management", version 8.7.0

NPL 5

3GPP TS 36.101, "Evolved Universal Terrestrial Radio Access (E-UTRA); User Equipment (UE) radio transmission and reception", version 8.7.0

BRIEF SUMMARY

One non-limiting and exemplary embodiment provides an improved method for power control in a mobile communication system with a mobile station in dual connectivity with a master and secondary base station, avoiding the problems of the prior art as identified above. Another exemplary embodiment provides the power headroom reporting so as to assist in the improved power control for dual connectivity scenarios.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature a method for power headroom reporting in a mobile communication system, wherein a mobile station is connected via a first radio link to a master base station and at least to one secondary base station via a secondary radio link, the method comprising the steps of: calculating by the mobile station a first power headroom report for the first radio link between the mobile station and the master base station, transmitting the calculated first power headroom report together with information allowing the master base station to determine information on the pathloss of the secondary radio link between the mobile station and the secondary base station, from the mobile station to the master base station, and calculating by the mobile station a secondary power headroom report for the secondary radio link between the mobile station and the secondary base station, and transmitting the calculated secondary power headroom report from the mobile station to the secondary base station.

The general aspect may be implemented using a system, a device, and a computer program, and any combination of systems, devices, and computer programs.

BRIEF DESCRIPTION OF THE SEVERAL VIEWS OF THE DRAWINGS

FIG. 1 shows an exemplary architecture of a 3GPP LTE system.

FIG. 2 shows an exemplary overview of the overall E-UTRAN architecture of 3GPP LTE.

FIG. 3 shows exemplary subframe boundaries on a downlink component carrier as defined for 3GPP LTE (Release 8/9).

FIG. 4 shows an exemplary downlink resource grid of a downlink slot as defined for 3GPP LTE (Release 8/9).

FIG. 5 shows the 3GPP LTE-A (Release 10) Layer 2 structure with activated carrier aggregation for the downlink.

FIG. 6 shows the 3GPP LTE-A (Release 10) Layer 2 structure with activated carrier aggregation for the uplink.

FIG. 7 illustrates a DRX operation of a mobile terminal and in particular the DRX opportunity, on-duration, according to the short and long DRX cycle.

FIG. 8 shows a Power Headroom Report, PHR, MAC control element as defined in 3GPP LTE (Release 8/9).

FIG. 9 illustrates an extended Power Headroom Report, ePHR, MAC control element as defined in 3GPP LTE (Release 10).

FIG. 10 illustrates a deployment scenario for small cell enhancement, where macro and small cells are on the same carrier frequency.

FIG. 11 illustrates further deployment scenarios for small cell enhancement where macro and small cells are on different carrier frequencies, the small cell being outdoor.

FIG. 12 illustrates further deployment scenarios for small cell enhancement where macro and small cells are on different carrier frequencies, the small cell being indoor.

FIG. 13 illustrates a further deployment scenario for small cell enhancement with only small cells.

FIG. 14 gives an overview of the communication system architecture for dual connectivity with macro and small eNBs connected to the core network, where the S1-U interface terminates in the Macro eNB and no bearer splitting is done in RAN.

FIGS. 15a-c illustrate the different options for having two separate EPS bearers between the SGW and the UE.

FIG. 16 illustrates a power-limited scenario of the prior art when the UE is connected to both a MeNB and SeNB, which in turn independently would control the output power of the UE for uplink transmission to the MeNB and SeNB.

DETAILED DESCRIPTION

Figure 17:
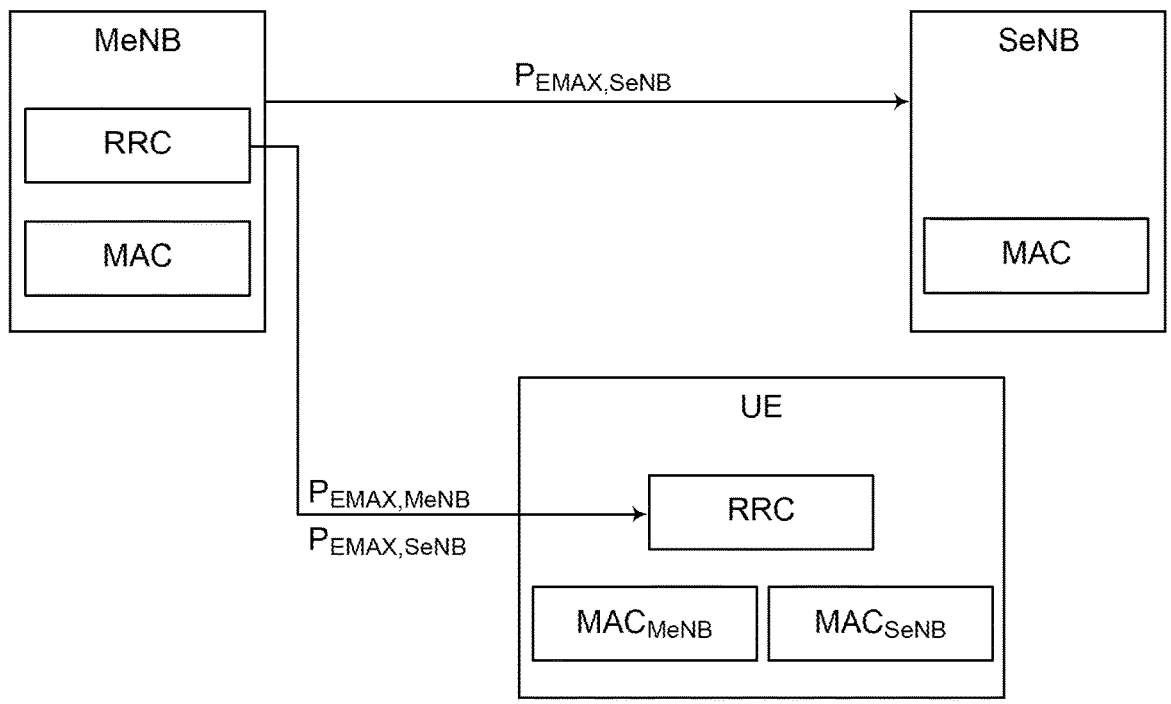
FIG. 17 illustrates the exchange of initial values of power parameters $P_{EMAX,MeNB}$ and $P_{EMAX,SeNB}$ to from the MeNB to the SeNB and UE, according to one alternative implementation.

It is assumed that the mobile station is in dual connectivity and thus connected to both a master base station and a secondary base station via respective radio links. As explained above, one of the problems in connection with the assumed scenario is the two schedulers in the master and secondary base station, which independently schedule uplink transmissions for the mobile station. This further includes that the master and secondary base station also control independently the power the mobile station shall use for the respective uplink transmissions. In order to avoid power-limited situations as shown exemplarily in FIG. 16, i.e., where the mobile station needs to perform power scaling so as to reduce power output to be within its power output limits, the present disclosure suggests as follows.

According to a first aspect of the present disclosure, the power control for the mobile station is mainly controlled by a single base station, be it the master base station or the secondary base station. In the following, for illustration purposes only, it is assumed that power control according to the first aspect of the present disclosure, is performed by the master base station, and not the secondary base station; of course, the first aspect of the present disclosure also applies with the corresponding necessary changes to a scenario where the secondary base station is the one controlling the power for the mobile station.

Consequently, the master base station is responsible for distributing the available maximum output power of the mobile station for uplink transmissions between uplink transmissions to the master base station and uplink transmissions to the secondary base station. The power distribution ratio between the two base stations can be defined by taking into account various parameters of the base stations and the intended communication, such as one or more of the following: pathloss on the radio links from the mobile station to the two base stations, traffic load for the two base stations, resource availability for the two radio links to the two base stations, etc.

The information on the pathloss can be available at the master base station e.g., by means of measurement, or by receiving virtual power headroom reports (see later). Load information may be directly received from the secondary base station, or the master base station derives same from buffer status reports that are received for the SeNB radio bearers at the master base station.

For example, the power distribution ratio could be: 50% of the maximum output power of the mobile station for uplink transmissions to the master base station, and the other remaining 50% of the maximum output power of the mobile station could be determined for uplink transmissions to the secondary base station. Of course any other power distribution ratio is possible as well, e.g., 40/60, 75/25, etc.

Correspondingly, the master base station determines two parameters in said respect: 1) the maximum output power of the mobile station for uplink transmissions to the master base station ($P_{EMAX,MeNB}$) and 2) the maximum output power of the mobile station for uplink transmissions to the secondary base station ($P_{EMAX,SeNB}$). These parameters are then to be used by the mobile station for performing uplink transmissions to the respective base stations.

Upon determination of these parameters, the other entities, i.e., the secondary base station and the mobile station, are to be informed accordingly on the parameters; this can be done in many ways, some of which are specified explicitly in the following.

According to a first alternative, the master base station takes care to inform the secondary base station as well as the mobile station about the necessary parameters, including: 1) transmitting the determined maximum output power of the mobile station for uplink transmissions to the secondary base station ($P_{EMAX,SeNB}$) from the master base station to the secondary base station, 2) transmitting the determined maximum output power of the mobile station for uplink transmissions to the secondary base station ($P_{EMAX,SeNB}$) from the master base station to the mobile station, 3) transmitting the determined maximum output power of the mobile station for uplink transmissions to the master base station ($P_{EMAX,MeNB}$) from the master base station to the mobile station.

According to a second alternative, the master base station transmits, the determined maximum output power of the mobile station for uplink transmissions to the secondary base station ($P_{EMAX,SeNB}$), to the secondary base station, and transmits, the determined maximum output power of the mobile station for uplink transmissions to the master base station ($P_{EMAX,MeNB}$), to the mobile station. Then, in contrast to the first alternative, the secondary base station forwards, the maximum output power of the mobile station for uplink transmissions to the secondary base station ($P_{EMAX,SeNB}$), received from the master base station, to the mobile station.

According to a further third alternative, the master base station transmits both, the determined maximum output power of the mobile station for uplink transmissions to the secondary base station ($P_{EMAX,SeNB}$) and the determined maximum output power of the mobile station for uplink transmissions to the master base station ($P_{EMAX,MeNB}$), to the mobile station. Then, the mobile station provides information, on the determined maximum output power of the mobile station for uplink transmissions to the secondary base station ($P_{EMAX,SeNB}$), to the secondary base station; this in turn can be done in various ways, e.g., as a separate parameter in connection with a power headroom report relating to the secondary radio link, or as part of a virtual power headroom report relating to the secondary radio link (more details below).

In any case, the two base stations as well as the mobile station get the information on the power distribution and thus can perform power control with a minimized risk of power limitation since the uplink scheduling and power control should be performed by the base stations in such a way that the maximum possible output power of the mobile station is not exceeded.

According to further improvements relating to this first aspect, the power distribution ratio, as initially defined by the master base station, shall be monitored and then updated (if necessary). The master base station, responsible for the power distribution control, is provided, among others by the mobile station, with the information necessary in said respect. As already mentioned above, one criterion based on which the master base station determines the power distribution ratio is the information on the pathloss on the respective radio links between the mobile station and the master/secondary base stations. Correspondingly, the mobile station assists the master base station for the updating of the power distribution ratio by providing appropriate information on the pathloss to the master base station.

First of all, the information on the pathloss on the first radio link between the mobile station and the master base station, can be determined by the master base station from usual power headroom reports relating to this first radio link, received from the mobile station; the power headroom value within the power headroom report is calculated by the mobile station based on the information on the pathloss on the first radio link to the master base station, and thus the master base station can derive this information on the pathloss on the first radio link from the received power headroom value. Furthermore pathloss information can be also derived from mobility measurement reports, i.e., RSRP/RSRQ measurements, for the first radio link provided to the master base station.

Furthermore, the master base station shall be provided with corresponding information on the pathloss on the secondary radio link between the mobile station and the secondary base station. The following should be noted in said respect. The power headroom report transmitted by the mobile station to the secondary base station, for the secondary radio link between the mobile station and the secondary base station, allows the secondary base station to determine the information on the pathloss on the secondary radio link, however would not allow the master base station to do the same, since the master base station, unlike the secondary base station, does not know the resource assignment based on which the mobile station calculated the corresponding power headroom report.

On the other hand, the virtual power headroom report for the secondary radio link, being calculated by the mobile station based on a pre-configured virtual uplink resource assignment for said secondary radio link to the secondary base station (the uplink resource assignment being predetermined and thus also known to the master base station), would allow the master base station to determine the information on the pathloss for the secondary radio link.

Therefore, according to one improvement of the first aspect, instead of directly transmitting the information on the pathloss from the mobile station to the master base station, the mobile station assists the master base station to determine and update the power distribution by calculating a virtual power headroom report for the secondary radio link and by transmitting same to the master base station. Preferably, the secondary virtual power headroom report (i.e., for the secondary radio link) is transmitted from the mobile station to the master base station, together with a "normal" power headroom report for the first radio link between the mobile station and the master base station.

Correspondingly, according to this improvement of the first aspect of the present disclosure, the power headroom reporting performed by the mobile station is adapted such that the mobile station performs the power headroom reporting for the first and secondary radio links in the usual manner (i.e., power headroom report on first radio link to master base station, and power headroom report on secondary radio link to secondary base station), but in addition, the mobile station calculates a virtual power headroom report for the secondary radio link and transmits same, together (i.e., in the same message) with the "usual" power headroom report for the first radio link, to the master base station.

In the above, when referring to the "power headroom report" for the secondary or first radio link, preferably the extended power headroom report is meant, which in addition to the power headroom value comprises a cell-specific maximum output power, configured by the mobile station for uplink transmissions from the mobile station to the master/secondary base station ($P_{CMAX,MeNB/SeNB}$), similar to $P_{CMAX,c}$ as defined by 3GPP and introduced in the background section.

As a result, the master base station is provided with the necessary information on the pathloss on both radio links and can thus adapt the power distribution ratio to the changing pathloss situations. The master base station can then decide to apply or not apply the updated power distribution ratio, i.e., to re-configure the power distribution ratio, by distributing the updated values for the maximum output power of the mobile station for uplink transmissions to the master and secondary base stations ($P_{EMAX,MeNB}$)/($P_{EMAX,SeNB}$) according to any one of the above-discussed alternatives. In any case, the secondary base station as well as the mobile station are provided with and adopt the updated values and can thus perform uplink scheduling and uplink transmissions according to these new updated values of the maximum output powers.

Above, the update of the power distribution ratio by the master base station has been mainly discussed with regard to a pathloss change and how the mobile station can assist the master base station in said respect by providing information on the pathloss (change) to the master base station in one way or another.

According to a second aspect of the present disclosure, the mobile station is extended with additional functionality to assist the master base station with regard to updating the power distribution for other cases as well, such as for the case where the radio link in the uplink will not be used (e.g., for a particular minimum length in time) or where a radio link (in the uplink) is broken. In both cases, it is advantageous if the power distribution is updated such that the power assigned to the radio link, not being used in the uplink or being broken, is rather used by the other radio link. This will be explained in detail in the following.

The main idea is that the mobile station determines when a radio link (be it the first or secondary radio link) is becoming inactive or broken (i.e., radio link failure), and then informs the other base station thereof, such that the power distribution ratio can be updated in a manner that the full power available for the mobile station is assigned to uplink transmissions to the other base station (over the working or used uplink radio link).

In more detail, the mobile station determines when the first radio link is becoming inactive, which means that the mobile station expects it will not transmit data in the uplink to the master base station for a particular time; which can be the case e.g., where the mobile station enters a discontinuous reception/transmission mode (DRX/DTX) for this first radio link. In this case, the secondary base station is informed about the first radio link becoming inactive, where in turn the secondary base station can determine an updated value for the maximum output power of the mobile station for uplink transmissions to the secondary base station ($P_{EMAX, SeNB}$), in particular the full maximum output power (since no power is needed for the uplink transmissions on the other radio link being inactive). This updated value can then be transmitted to the mobile station, such that the mobile station adopts and uses the updated value for its maximum output power for uplink transmissions to the secondary base station.

Similarly, the mobile determines when the secondary radio link is becoming inactive, which means that the mobile station expects it will not transmit data in the uplink to the secondary base station for a particular time; which can be the case e.g., where the mobile station enters a discontinuous reception/transmission mode (DRX/DTX) for this secondary radio link. In this particular case, the master base station is informed about the secondary radio link becoming inactive; where in turn the master base station can determine an updated value for the maximum output power of the mobile station for uplink transmissions to the master base station ($P_{EMAX,MeNB}$), in particular the full maximum output power (since no power is needed for uplink transmissions on the other radio link being inactive). This updated value can then be transmitted to the mobile station, such that the mobile station adopts and uses the updated value for its maximum output power for uplink transmissions to the master base station.

In order to inform the master/secondary base station on the secondary/first radio link becoming inactive as explained above, there are several options, some of which will be specified below.

When the mobile station determines that the secondary radio link becomes inactive for the uplink, it can prepare a first power headroom report for the first radio link between the mobile station and the master base station, it can set a pre-determined flag therein to inform the master base station accordingly, and it can then send the thus-prepared first power headroom report to the master base station. Alternatively, it can prepare a secondary virtual power headroom report for the secondary radio link between the mobile station and the secondary base station, it can set a pre-determined flag therein to inform the master base station accordingly, and it can then send the thus-prepared secondary virtual power headroom report to the master base station. According to still another alternative, the mobile station can prepare a secondary virtual power headroom report for the secondary radio link, but with a pre-determined power headroom value (e.g., a negative value) which is identified by the master base station to mean that the secondary radio link is becoming inactive for the uplink; the thus-prepared secondary virtual power headroom report is then sent from the mobile station to the master base station.

Conversely, when the mobile station determines that the first radio link between the mobile station and the master base station will become inactive for the uplink, it can prepare a secondary power headroom report for the secondary radio link, it can set a pre-determined flag therein to inform the secondary base station accordingly, and it can then send the thus-prepared secondary power headroom report to the secondary base station. Alternatively, the mobile station can prepare a secondary virtual power headroom report for the secondary radio link, it can set a pre-determined flag therein to inform the secondary base station accordingly, and it can then send the thus-prepared secondary virtual power headroom report to the secondary base station. According to still another alternative, the mobile station can prepare a secondary virtual power headroom report for the secondary radio link, but with a pre-determined power headroom value (e.g., a negative value)

which is then identified by the secondary base station to mean that the first radio link is becoming inactive for the uplink; the thus-prepared secondary virtual power headroom report is then sent from the mobile station to the secondary base station.

According to a further improvement of the above reporting of the first/secondary radio link becoming inactive, the mobile station can determine/estimate a length in time that the first/secondary radio link is expected to be inactive for the uplink, and only in case the determined length in time exceeds a pre-determined length in time (e.g., 100 or 200 ms, etc.), the corresponding base station (secondary/master) will be informed on the situation. This is advantageous such that this mechanism of re-configuring the power distribution to be effective, and not to be performed for very short times of inactivity.

Still another improvement of the above second aspect is that the base station (first or secondary as appropriate) will return the power distribution to the previous state (i.e., to the power distribution ratio before the update) after a particular time, without having to be again instructed by the mobile station. In more detail, as explained above, the master/secondary base stations are informed by the mobile station when the secondary/first radio links become inactive, in order for the master/secondary base station to update the power distribution and provide the mobile station with updated values of the maximum output power to be used for uplink transmissions to the master/secondary base station. In order to avoid the need for the mobile station to again inform the master/base station when the secondary/first radio link becomes active again, it is possible to configure a power control timer that, when it expires, triggers the master/secondary base station to return to the power distribution ratio before the update. The value of the power control timer can either be pre-determined and configured previously; or according to a further improvement, it may be informed by the mobile station (which presumably has the best knowledge on when the inactive time of a radio link is expected to end) for each case e.g., by directly transmitting the corresponding power control timer value to the master/secondary base station, or preferably by encoding the power control timer value in the (e.g., negative) power headroom value of the secondary virtual power headroom report transmitted from the mobile station to the master/secondary base station to inform the master/secondary base station on the secondary/first radio link becoming inactive before (see above).

The above-mentioned power control timer is preferably started by the master/secondary base station when determining and transmitting the updated maximum output power of the mobile station for uplink transmissions to the master/secondary base station, and runs for a particular time (see above).

In a similar manner, the above-noted situation where the mobile station determines that the first/secondary radio link enters a radio link failure state (i.e., becomes broken) is explained in the following.

When the mobile station determines that the secondary radio link from the mobile station to the secondary base station enters a radio link failure state, the mobile station shall inform the master base station accordingly over the working radio link. This may be done e.g., according to one of the following ways.

When the mobile station determines the radio link failure of the secondary radio link to the secondary base station, it prepares a first power headroom report for the first radio link between the mobile station and the master base station, it sets a corresponding pre-determined flag therein to inform the master base station accordingly, and it can then send the thus-prepared first power headroom report for the first radio link to the master base station. Alternatively, the mobile station can prepare a secondary virtual power headroom report for the secondary radio link between the mobile station and the secondary base station, it can set a corresponding pre-determined flag therein to inform the master base station accordingly, and it can then send the thus-prepared secondary virtual power headroom report to the master base station. According to still another alternative, the mobile station can prepare a secondary virtual power headroom report for the secondary radio link between the mobile station and the secondary base station, but with a pre-determined virtual power headroom value which is identified by the master base station to indicate the radio link failure of the secondary radio link; the thus-prepared secondary virtual power headroom report is then sent from the mobile station to the master base station.

After the master base station receives the information about the secondary radio link failure, the master base station can determine an updated value for the maximum output power of the mobile station for uplink transmissions to the master base station ($P_{EMAX,MeNB}$), this updated parameter is then transmit to the mobile station. For instance, the master base station can determine that the mobile station can use all of its maximum output power for uplink transmissions to the master base station, since no uplink transmissions to the secondary base station are possible due to the secondary radio link failure. According to a preferable solution, the master base station also initiates an appropriate procedure to solve the radio link failure of the secondary radio link.

Conversely, when the mobile station determines the radio link failure of the first radio link to the master base station, it prepares a secondary power headroom report for the secondary radio link, it sets a corresponding pre-determined flag therein to inform the secondary base station accordingly, and it then sends the thus-prepared secondary power headroom report to the secondary base station. Alternatively, the mobile station prepares a secondary virtual power headroom report for the secondary radio link, it sets a corresponding pre-determined flag therein to inform the secondary base station accordingly, and it then sends the thus-prepared secondary virtual power headroom report to the secondary base station. According to still another alternative, the mobile station prepares a secondary virtual power headroom report for the secondary radio link, but with a pre-determined virtual power headroom value which is identified by the master base station to indicate the radio link failure of the first radio link; the thus-prepared secondary virtual power headroom report is then sent from the mobile station to the secondary base station.

After the secondary base station receives the information about the first radio link failure, the secondary base station can determine an updated value for the maximum output power of the mobile station for uplink transmissions to the secondary base station ($P_{EMAX,SeNB}$), this updated parameter is then transmit to the mobile station. For instance, the secondary base station can determine that the mobile station can use all of its maximum output power for uplink transmissions to the secondary base station, since no uplink transmissions to the master base station are possible due to the first radio link failure. According to a preferable solution, the secondary base station also initiates an appropriate procedure to solve the radio link failure of the first radio link.

An embodiment of the present disclosure provides a method for power headroom reporting in a mobile communication system. A mobile station is connected via a first radio link to a master base station and at least to one secondary base station via a secondary radio link. The mobile station calculates a first power headroom report for the first radio link between the mobile station and the master base station. The mobile station transmits the calculated first power headroom report together with information allowing the master base station to determine information on the pathloss of the secondary radio link between the mobile station and the secondary base station, to the master base station. Furthermore, the mobile station the mobile station calculates a secondary power headroom report for the secondary radio link between the mobile station and the secondary base station, and transmitting the calculated secondary power headroom report from the mobile station to the secondary base station.

According to an advantageous variant of the embodiment of the present disclosure which can be used in addition or alternatively to the above, the information, from which the master base station determines the information on the pathloss, is transmitted in form of a secondary virtual power headroom report for the secondary radio link between the mobile station and the secondary base station. In said case, the mobile station further calculates the secondary virtual power headroom report for the secondary radio link between the mobile station and the secondary base station, based on a pre-configured virtual uplink resource assignment for said secondary radio link to the secondary base station. According to an advantageous variant of the embodiment of the present disclosure which can be used in addition or alternatively to the above, the master base station determines an initial distribution of the available maximum transmit power of the mobile station between the master base station and the secondary base station; which comprises the step of determining a maximum output power of the mobile station for uplink transmissions to the master base station ($P_{EMAX,MeNB}$) and a maximum output power of the mobile station for uplink transmissions to the secondary base station ($P_{EMAX,SeNB}$). The determined maximum output power of the mobile station for uplink transmissions to the secondary base station ($P_{EMAX,SeNB}$), is transmitted from the master base station to the secondary base station, preferably in a signaling message transmitted on the interface between the master and secondary base station. Then, either the determined maximum output power of the mobile station for uplink transmissions to the master base station ($P_{EMAX,MeNB}$) and the determined maximum output power of the mobile station for uplink transmissions to the secondary base station ($P_{EMAX,SeNB}$), are transmitted from the master base station to the mobile station, preferably in a Radio Resource Control, RRC, message or in a Media Access Control, MAC, control element, OR the determined maximum output power of the mobile station for uplink transmissions to the master base station ($P_{EMAX,MeNB}$), is transmitted from the master base station to the mobile station, preferably in a Radio Resource Control, RRC, message or in a Media Access Control, MAC, control element, and the determined maximum output power of the mobile station for uplink transmissions to the secondary base station ($P_{EMAX,SeNB}$), is transmitted from the secondary base station to the mobile station.

According to an alternative and advantageous variant of the embodiment of the present disclosure which can be used in addition or alternatively to the above, the master base station determines an initial distribution of the available maximum transmit power of the mobile station between the master base station and the secondary base station, which comprises the step of determining a maximum output power of the mobile station for uplink transmissions to the master base station ($P_{EMAX,MeNB}$) and a maximum output power of the mobile station for uplink transmissions to the secondary base station ($P_{EMAX,SeNB}$). Then, the determined maximum output power of the mobile station for uplink transmissions to the master base station ($P_{EMAX,MeNB}$), and the determined maximum output power of the mobile station for uplink transmissions to the secondary base station ($P_{EMAX,SeNB}$), are transmitted from the master base station to the mobile station, preferably in a Radio Resource Control, RRC, message or in a Media Access Control, MAC, control element. In addition, the mobile station transmits to the secondary base station, information on the received maximum output power of the mobile station for uplink transmissions to the secondary base station ($P_{EMAX,SeNB}$).

According to an advantageous variant of the embodiment of the present disclosure which can be used in addition or alternatively to the above, the step of, transmitting by the mobile station to the secondary base station, information on the received maximum output power of the mobile station for uplink transmissions to the secondary base station ($P_{EMAX,SeNB}$), comprises the steps of: determining for a secondary virtual power headroom report a cell-specific maximum output power, configured by the mobile station for uplink transmissions from the mobile station to the secondary base station ($P_{CMAX,SeNB}$) based on the received maximum output power of the mobile station for uplink transmissions to the secondary base station ($P_{EMAX,SeNB}$), and transmitting the determined cell-specific maximum output power, configured by the mobile station for uplink transmissions from the mobile station to the secondary base station ($P_{CMAX,SeNB}$), from the mobile station to the secondary base station, for the secondary base station to determine the maximum output power of the mobile station for uplink transmissions to the secondary base station ($P_{EMAX,SeNB}$).

According to an advantageous variant of the embodiment of the present disclosure which can be used in addition or alternatively to the above, the step of, transmitting by the mobile station to the secondary base station, information on the received maximum output power of the mobile station for uplink transmissions to the secondary base station ($P_{EMAX,SeNB}$), comprises the steps of: calculating by the mobile station a secondary virtual power headroom report for the secondary radio link between the mobile station and the secondary base station, based on a pre-configured virtual uplink resource assignment for said secondary radio link to the secondary base station, comprising the determination of a cell-specific maximum output power, configured by the mobile station for uplink transmissions from the mobile station to the secondary base station ($P_{CMAX,SeNB}$) based on the received maximum output power of the mobile station for uplink transmissions to the secondary base station ($P_{EMAX,SeNB}$), and transmitting the calculated secondary virtual power headroom report and the determined cell-specific maximum output power, configured by the mobile station, for uplink transmissions from the mobile station to the secondary base station ($P_{CMAX,SeNB}$), from the mobile station to the secondary base station, for the secondary base station to determine the maximum output power of the mobile station for uplink transmissions to the secondary base station ($P_{EMAX,SeNB}$).

According to an advantageous variant of the embodiment of the present disclosure which can be used in addition or alternatively to the above, the master base station determines an updated distribution of the available maximum transmit power of the mobile station between the master base station and the secondary base station, based on the determined information on the pathloss of the secondary radio link between the mobile station and the secondary base station; this comprises determining updated values for the maximum output power of the mobile station for uplink transmissions to the master base station ($P_{EMAX,MeNB}$) and the maximum output power of the mobile station for uplink transmissions to the secondary base station ($P_{EMAX,SeNB}$). The updated maximum output power of the mobile station for uplink transmissions to the secondary base station ($P_{EMAX,SeNB}$), is transmitted from the master base station to the secondary base station. Then, either the updated maximum output power of the mobile station for uplink transmissions to the master base station ($P_{EMAX,MeNB}$) and the updated maximum output power of the mobile station for uplink transmissions to the secondary base station ($P_{EMAX,SeNB}$), are transmitted from the master base station to the mobile station, OR the updated maximum output power of the mobile station for uplink transmissions to the master base station ($P_{EMAX,MeNB}$), is transmitted from the master base station to the mobile station, and the updated maximum output power of the mobile station for uplink transmissions to the secondary base station ($P_{EMAX,SeNB}$), is transmitted from the secondary base station to the mobile station.

According to an advantageous variant of the embodiment of the present disclosure which can be used in addition or alternatively to the above, the calculated first power headroom report for the first radio link is an extended power headroom report that further comprises a cell-specific maximum output power, configured by the mobile station for uplink transmissions from the mobile station to the master base station ($P_{CMAX,MeNB}$), and the calculated secondary power headroom report for the secondary radio link is an extended power headroom report that further comprises a cell-specific maximum output power, configured by the mobile station for uplink transmission from the mobile station to the secondary base station ($P_{CMAX,SeNB}$).

According to an advantageous variant of the embodiment of the present disclosure which can be used in addition or alternatively to the above, when the mobile station determines that the secondary radio link between the mobile station and the secondary base station will become inactive for the uplink, the mobile station provides information to the master base station about the secondary radio link becoming inactive for the uplink. In a preferable solution, the information, about the secondary radio link becoming inactive for the uplink, is provided to the master base station in the form of:

a bit flag with a pre-determined value in the first power headroom report for the first radio link between the mobile station and the master base station, or a bit flag with a pre-determined value in the secondary virtual power headroom report for the secondary radio link between the mobile station and the secondary base station, or a pre-determined power headroom value of the secondary virtual power headroom report for the secondary radio link between the mobile station and the secondary base station.

According to an advantageous variant of the embodiment of the present disclosure which can be used in addition or alternatively to the above, the mobile station determines a length in time that the secondary radio link is expected to be inactive for the uplink, and only in case the determined length in time exceeds a pre-determined length in time, the mobile station provides information to the master base station about the secondary radio link becoming inactive for the uplink.

According to an advantageous variant of the embodiment of the present disclosure which can be used in addition or alternatively to the above, the information, about the secondary radio link becoming inactive for the uplink, is provided to the master base station in the form of a pre-determined power headroom value of the secondary virtual power headroom report for the secondary radio link between the mobile station and the secondary base station. The pre-determined power headroom value is a pre-determined negative value, preferably encoding time information about a length in time that the secondary radio link is expected by the mobile station to be inactive for the uplink.

According to an advantageous variant of the embodiment of the present disclosure which can be used in addition or alternatively to the above, the master base station determines an updated distribution of the available maximum transmit power of the mobile station between the master base station and the secondary base station, based on the received information about the secondary radio link becoming inactive for the uplink, comprising at least determining an updated value for the maximum output power of the mobile station for uplink transmissions to the master base station ($P_{EMAX,MeNB}$). The master base station transmits, the updated maximum output power of the mobile station for uplink transmissions to the master base station ($P_{EMAX,MeNB}$), to the mobile station.

According to an advantageous variant of the embodiment of the present disclosure which can be used in addition or alternatively to the above, the master base station starts a power control timer, when determining and transmitting the updated maximum output power of the mobile station for uplink transmissions to the master base station ($P_{EMAX,MeNB}$). Upon expiry of the power control timer, the master base station transmits, the maximum output power of the mobile station for uplink transmissions to the master base station ($P_{EMAX,MeNB}$) before the update, to the mobile station. The power control timer is preferably configured:

with a pre-determined time value, or a time value as indicated by the mobile station in the received secondary virtual power headroom report with the pre-determined negative power headroom value, in case the information about the secondary radio link becoming inactive for the uplink is provided to the master base station in the form of a pre-determined power headroom value of the secondary virtual power headroom report for the secondary radio link between the mobile station and the secondary base station, and wherein the pre-determined power headroom value is a pre-determined negative value, preferably encoding time information about a length in time that the secondary radio link is expected to be inactive for the uplink.

According to an advantageous variant of the embodiment of the present disclosure which can be used in addition or alternatively to the above, when the mobile station determines that the first radio link between the mobile station and the master base station will become inactive for the uplink, the mobile station provides information to the secondary base station about the first radio link becoming inactive for the uplink. The information, about the first radio link becoming inactive for the uplink, is provided to the secondary base station in the form of:

a bit flag with a pre-determined value in the secondary power headroom report for the secondary radio link between the mobile station and the secondary base station, or a bit flag with a pre-determined value in the secondary virtual power headroom report for the secondary radio link between the mobile station and the secondary base station, or a pre-determined power headroom value of the secondary virtual power headroom report for the secondary radio link between the mobile station and the secondary base station.

According to an advantageous variant of the embodiment of the present disclosure which can be used in addition or alternatively to the above, the mobile station determines a length in time that the first radio link is expected to be inactive for the uplink, and wherein only in case the determined length in time exceeds a pre-determined length in time, the mobile station provides information to the secondary base station about the first radio link becoming inactive for the uplink.

According to an advantageous variant of the embodiment of the present disclosure which can be used in addition or alternatively to the above, the information, about the first radio link becoming inactive for the uplink, is provided to the secondary base station in the form of a pre-determined power headroom value of the secondary virtual power headroom report for the secondary radio link between the mobile station and the secondary base station. In said case, the pre-determined power headroom value is a pre-determined negative value, preferably encoding time information about a length in time that the first radio link is expected by the mobile station to be inactive for the uplink.

According to an advantageous variant of the embodiment of the present disclosure which can be used in addition or alternatively to the above, the secondary base station determines an updated value for the maximum output power of the mobile station for uplink transmissions to the secondary base station ($P_{EMAX,SeNB}$). The secondary base station transmits, the updated maximum output power of the mobile station for uplink transmissions to the secondary base station ($P_{EMAX,SeNB}$), to the mobile station.

According to an advantageous variant of the embodiment of the present disclosure which can be used in addition or alternatively to the above, the secondary base station starts a power control timer, when determining and transmitting the updated maximum output power of the mobile station for uplink transmissions to the secondary base station ($P_{EMAX,SeNB}$). Upon expiry of the power control timer, the master base station transmits, the maximum output power of the mobile station for uplink transmissions to the master base station ($P_{EMAX,SeNB}$) before the update, to the mobile station. Preferably, the power control timer is configured:

with a pre-determined time value, or a time value as indicated by the mobile station in the received secondary virtual power headroom report with the pre-determined negative power headroom value, in case the information about the first radio link becoming inactive for the uplink is provided to the secondary base station in the form of a pre-determined power headroom value of the secondary virtual power headroom report for the secondary radio link between the mobile station and the secondary base station, and wherein the pre-determined power headroom value is a pre-determined negative value, preferably encoding time information about a length in time that the first radio link is expected by the mobile station to be inactive for the uplink.

According to an advantageous variant of the embodiment of the present disclosure which can be used in addition or alternatively to the above, when the secondary radio link from the mobile station to the secondary base station enters a radio link failure state, the mobile station provides information to the master base station about the radio link failure of the secondary radio link preferably in the form of:

a bit flag with a pre-determined value in the first power headroom report for the first radio link between the mobile station and the master base station, or a bit flag with a pre-determined value in the secondary virtual power headroom report for the secondary radio link between the mobile station and the secondary base station, or a pre-determined power headroom value of the secondary virtual power headroom report for the secondary radio link between the mobile station and the secondary base station.

According to an advantageous variant of the embodiment of the present disclosure which can be used in addition or alternatively to the above, the master base station determines an updated distribution of the available maximum transmit power of the mobile station between the master base station and the secondary base station, based on the received information about the radio link failure of the secondary radio link; which comprises at least the step of determining an updated value for the maximum output power of the mobile station for uplink transmissions to the master base station ($P_{EMAX,MeNB}$). The master base station transmits, the updated value for the maximum output power of the mobile station for uplink transmissions to the master base station ($P_{EMAX,MeNB}$), to the mobile station. Preferably, the master base station initiates an appropriate procedure to solve the radio link failure of the secondary radio link.

According to an advantageous variant of the embodiment of the present disclosure which can be used in addition or alternatively to the above, when the first radio link from the mobile station to the secondary base station enters a radio link failure state, the mobile station provides information to the secondary base station about the radio link failure of the first radio link preferably in the form of:

a bit flag with a pre-determined value in the secondary power headroom report for the secondary radio link between the mobile station and the secondary base station, or a bit flag with a pre-determined value in the secondary virtual power headroom report for the secondary radio link between the mobile station and the secondary base station, or a pre-determined power headroom value of the secondary virtual power headroom report for the secondary radio link between the mobile station and the secondary base station.

According to an advantageous variant of the embodiment of the present disclosure which can be used in addition or alternatively to the above, the secondary base station determines an updated value for the maximum output power of the mobile station for uplink transmissions to the secondary base station ($P_{EMAX,SeNB}$). The secondary base station transmits, the updated maximum output power of the mobile station for uplink transmissions to the secondary base station ($P_{EMAX,SeNB}$), to the mobile station. Preferably, the secondary base station initiates an appropriate procedure to solve the radio link failure of the first radio link.

The first embodiment of the present disclosure further provides a mobile station for power headroom reporting in a mobile communication system, wherein the mobile station is connectable via a first radio link to a master base station and at least to one secondary base station via a secondary radio link. A processor of the mobile station calculates a first power headroom report for the first radio link between the mobile station and the master base station. A transmitter of the mobile station transmits the calculated first power headroom report together with information allowing the master base station to determine information on the pathloss of the secondary radio link between the mobile station and the secondary base station, to the master base station. The processor further calculates a secondary power headroom report for the secondary radio link between the mobile station and the secondary base station. The transmitter then transmits the calculated secondary power headroom report to the secondary base station.

According to an advantageous variant of the embodiment of the present disclosure which can be used in addition or alternatively to the above, the information, from which the master base station determines the information on the pathloss, is transmitted in form of a secondary virtual power headroom report for the secondary radio link between the mobile station and the secondary base station. In said case, the processor calculates the secondary virtual power headroom report for the secondary radio link between the mobile station and the secondary base station, based on a pre-configured virtual uplink resource assignment for said secondary radio link to the secondary base station.

According to an advantageous variant of the embodiment of the present disclosure which can be used in addition or alternatively to the above, a receiver of the mobile station receives a maximum output power of the mobile station for uplink transmissions to the secondary base station ($P_{EMAX,SeNB}$) and/or receives a maximum output power of the mobile station for uplink transmissions to the master base station ($P_{EMAX,MeNB}$) from the master base station, preferably in a Radio Resource Control, RRC, message or in a Media Access Control, MAC, control element.

According to an advantageous variant of the embodiment of the present disclosure which can be used in addition or alternatively to the above, a receiver of the mobile station receives a maximum output power of the mobile station for uplink transmissions to the secondary base station ($P_{EMAX,SeNB}$), wherein the transmitter transmits to the secondary base station, information on the received maximum output power of the mobile station for uplink transmissions to the secondary base station ($P_{EMAX,SeNB}$).

According to an advantageous variant of the embodiment of the present disclosure which can be used in addition or alternatively to the above, the processor determines for a secondary virtual power headroom report a cell-specific maximum output power, configured by the mobile station for uplink transmissions from the mobile station to the secondary base station ($P_{CMAX,SeNB}$) based on the received maximum output power of the mobile station for uplink transmissions to the secondary base station ($P_{EMAX,SeNB}$). The transmitter transmits the determined cell-specific maximum output power, configured by the mobile station for uplink transmissions from the mobile station to the secondary base station ($P_{CMAX,SeNB}$), to the secondary base station, for the secondary base station to determine the maximum output power of the mobile station for uplink transmissions to the secondary base station ($P_{EMAX,SeNB}$).

According to an alternative advantageous variant of the embodiment of the present disclosure which can be used in addition or alternatively to the above, the processor calculates a secondary virtual power headroom report for the secondary radio link between the mobile station and the secondary base station, based on a pre-configured virtual uplink resource assignment for said secondary radio link to the secondary base station, comprising the determination of a cell-specific maximum output power, configured by the mobile station for uplink transmissions from the mobile station to the secondary base station ($P_{CMAX,SeNB}$) based on the received maximum output power of the mobile station for uplink transmissions to the secondary base station ($P_{EMAX,SeNB}$). The transmitter transmits the calculated secondary virtual power headroom report and the determined cell-specific maximum output power, configured by the mobile station, for uplink transmissions from the mobile station to the secondary base station ($P_{CMAX,SeNB}$), to the secondary base station, for the secondary base station to determine the maximum output power of the mobile station for uplink transmissions to the secondary base station ($P_{EMAX,SeNB}$).

According to an advantageous variant of the embodiment of the present disclosure which can be used in addition or alternatively to the above, when the processor determines that the secondary radio link between the mobile station and the secondary base station will become inactive for the uplink, the transmitter provides information to the master base station about the secondary radio link becoming inactive for the uplink, preferably in the form of:

a bit flag with a pre-determined value in the first power headroom report for the first radio link between the mobile station and the master base station, or a bit flag with a pre-determined value in the secondary virtual power headroom report for the secondary radio link between the mobile station and the secondary base station, or a pre-determined power headroom value of the secondary virtual power headroom report for the secondary radio link between the mobile station and the secondary base station.

According to an advantageous variant of the embodiment of the present disclosure which can be used in addition or alternatively to the above, the processor determines a length in time that the secondary radio link is expected to be inactive for the uplink, and wherein only in case the determined length in time exceeds a pre-determined length in time, the transmitter provides information to the master base station about the secondary radio link becoming inactive for the uplink.

According to an advantageous variant of the embodiment of the present disclosure which can be used in addition or alternatively to the above, the information, about the secondary radio link becoming inactive for the uplink, is provided to the master base station in the form of a pre-determined power headroom value of the secondary virtual power headroom report for the secondary radio link between the mobile station and the secondary base station. In said case, the processor sets the pre-determined power headroom value to a pre-determined negative value, preferably encoding time information about a length in time that the secondary radio link is expected by the mobile station to be inactive for the uplink.

According to an advantageous variant of the embodiment of the present disclosure which can be used in addition or alternatively to the above, when the processor determines that the first radio link between the mobile station and the master base station will become inactive for the uplink, the transmitter provides information to the secondary base station about the first radio link becoming inactive for the uplink, preferably in the form of:

a bit flag with a pre-determined value in the secondary power headroom report for the secondary radio link between the mobile station and the secondary base station, or a bit flag with a pre-determined value in the secondary virtual power headroom report for the secondary radio link between the mobile station and the secondary base station, or a pre-determined power headroom value of the secondary virtual power headroom report for the secondary radio link between the mobile station and the secondary base station.

According to an advantageous variant of the embodiment of the present disclosure which can be used in addition or alternatively to the above, the processor determines a length in time that the first radio link is expected to be inactive for the uplink, and wherein only in case the determined length in time exceeds a pre-determined length in time, the transmitter provides information to the secondary base station about the first radio link becoming inactive for the uplink.

According to an advantageous variant of the embodiment of the present disclosure which can be used in addition or alternatively to the above, the information, about the first radio link becoming inactive for the uplink, is provided to the secondary base station in the form of a pre-determined power headroom value of the secondary virtual power headroom report for the secondary radio link between the mobile station and the secondary base station. In said case, the processor sets the pre-determined power headroom value to a pre-determined negative value, preferably encoding time information about a length in time that the first radio link is expected by the mobile station to be inactive for the uplink.

According to an advantageous variant of the embodiment of the present disclosure which can be used in addition or alternatively to the above, when the processor determines that the secondary radio link between the mobile station and the secondary base station enters a radio link failure, the transmitter provides information to the master base station about the first radio link failure preferably in the form of:

a bit flag with a pre-determined value in the first power headroom report for the first radio link between the mobile station and the master base station, or a bit flag with a pre-determined value in the secondary virtual power headroom report for the secondary radio link between the mobile station and the secondary base station, or a pre-determined power headroom value of the secondary virtual power headroom report for the secondary radio link between the mobile station and the secondary base station.

According to an advantageous variant of the embodiment of the present disclosure which can be used in addition or alternatively to the above, when the processor determines that the first radio link between the mobile station and the master base station enters a radio link failure, the transmitter provides information to the secondary base station about the secondary radio link failure preferably in the form of:

a bit flag with a pre-determined value in the secondary power headroom report for the secondary radio link between the mobile station and the secondary base station, or a bit flag with a pre-determined value in the secondary virtual power headroom report for the secondary radio link between the mobile station and the secondary base station, or a pre-determined power headroom value of the secondary virtual power headroom report for the secondary radio link between the mobile station and the secondary base station.

According to an advantageous variant of the embodiment of the present disclosure which can be used in addition or alternatively to the above, a receiver receives an updated value for the maximum output power of the mobile station for uplink transmissions to the secondary base station ($P_{EMAX,SeNB}$), and receives an updated value for the maximum output power of the mobile station for uplink transmissions to the master base station ($P_{EMAX,MeNB}$).

The first embodiment of the present disclosure further provides a master base station for receiving power headroom reports from a mobile station in a mobile communication system. The mobile station is connected via a first radio link to the master base station and at least to one secondary base station via a secondary radio link. A receiver of the master base station receives from the mobile station a first power headroom report together with information allowing the master base station to determine information on the pathloss of the secondary radio link between the mobile station and the secondary base station. A processor of the master base station determines information on the pathloss of the secondary radio link between the mobile station and the secondary base station, based on the received information.

According to an advantageous variant of the embodiment of the present disclosure which can be used in addition or alternatively to the above, the processor determines an initial distribution of the available maximum transmit power of the mobile station between the master base station and the secondary base station; which comprises the step of determining a maximum output power of the mobile station for uplink transmissions to the master base station ($P_{EMAX,MeNB}$) and a maximum output power of the mobile station for uplink transmissions to the secondary base station ($P_{EMAX,SeNB}$). A transmitter of the master base station transmits the determined maximum output power of the mobile station for uplink transmissions to the secondary base station ($P_{EMAX,SeNB}$), to the secondary base station, preferably in a signaling message transmitted on the interface between the master and secondary base station. The transmitter transmits the determined maximum output power of the mobile station for uplink transmissions to the master base station ($P_{EMAX,MeNB}$) and/or the determined maximum output power of the mobile station for uplink transmissions to the secondary base station ($P_{EMAX,SeNB}$), to the mobile station, preferably in a Radio Resource Control, RRC, message or in a Media Access Control, MAC, control element.

According to an advantageous variant of the embodiment of the present disclosure which can be used in addition or alternatively to the above, the processor determines an updated distribution of the available maximum transmit power of the mobile station between the master base station and the secondary base station, based on the determined information on the pathloss of the secondary radio link between the mobile station and the secondary base station; which comprises the step of determining updated values for the maximum output power of the mobile station for uplink transmissions to the master base station ($P_{EMAX,MeNB}$) and the maximum output power of the mobile station for uplink transmissions to the secondary base station ($P_{EMAX,SeNB}$). A transmitter of the master base station transmits the updated maximum output power of the mobile station for uplink transmissions to the secondary base station ($P_{EMAX,SeNB}$), to the secondary base station. The transmitter transmits the updated maximum output power of the mobile station for uplink transmissions to the master base station ($P_{EMAX,MeNB}$) and/or the updated maximum output power of the mobile station for uplink transmissions to the secondary base station ($P_{EMAX,SeNB}$), to the mobile station.

A "mobile station" or "mobile node" is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

The term "master base station" used in the claims and throughout the description of the present disclosure is to be construed as used in the field of dual connectivity of 3GPP LTE-A; thus, other terms are macro base station, or master/macro eNB; or serving base station or any other terminology to be decided later by 3GPP. Similarly, the term "secondary base station" used in the claims and throughout the description is to be construed as used in the field of dual connectivity of 3GPP LTE-A; thus, other terms are slave base station, or secondary/slave eNB or any other terminology to be decided later by 3GPP.

The term "radio link" used in the claims and throughout the description of the present disclosure is to be understood in a broad way as the radio connection between the mobile station and a base station.

The term "power headroom report" shall refer, for a particular embodiment of the present disclosure, to the power headroom report as defined in 3GPP, preferably shall refer to the extended power headroom report as defined in 3GPP.

The term "virtual power headroom report" shall refer, for a particular embodiment of the present disclosure, to the virtual power headroom report as defined in 3GPP.

In the following, several embodiments of the present disclosure will be explained in detail. For exemplary purposes only, most of the embodiments are outlined in relation to a radio access scheme according to 3GPP LTE (Release 8/9) and LTE-A (Release 10/11) mobile communication systems, partly discussed in the Technical Background section above. It should be noted that the present disclosure may be advantageously used for example in a mobile communication system such as 3GPP LTE-A (Release 12) communication systems as described in the Technical Background section above. These embodiments are described as implementations for use in connection with and/or for enhancement of functionality specified in 3GPP LTE and/or LTE-A. In this respect, the terminology of 3GPP LTE and/or LTE-A is employed throughout the description. Further, exemplary configurations are explored to detail the full breadth of the present disclosure.

The explanations should not be understood as limiting the present disclosure, but as a mere example of the embodiments to better understand the present disclosure. A skilled person should be aware that the general principles of the present disclosure as laid out in the claims can be applied to different scenarios and in ways that are not explicitly described herein. Correspondingly, the following scenarios assumed for explanatory purposes of the various embodiments shall not limit the present disclosure as such.

In connection with the present disclosure, various implementations will be explained. To simplify the illustration of the principles of the present disclosure, several assumptions are made; however, it should be noted that these assumptions should not be interpreted as limiting the scope of the present disclosure, as broadly defined by the claims.

The present disclosure will be described with reference to FIGS. 17 to 23. A dual connectivity scenario in a small cell environment is assumed, where the UE is connected to both a MeNB and a SeNB respectively via a first and secondary radio link. It should be noted however that the present disclosure is not restricted to this scenario; for instance, scenarios where the UE is connected to a MeNB and at least two SeNBs are also possible.

According to the present disclosure, one of the MeNB and SeNB has the responsibility to control the power distribution for the UE for uplink transmissions to the MeNB and uplink transmissions to the SeNB. For the ensuing description of the present disclosure, it is assumed that the MeNB takes the responsibility to control the power distribution; however, the principles of the present disclosure can be equally applied (with the obviously necessary changes) to a scenario where the SeNB is chosen to take the responsibility to control the power distribution.

In accordance with power control as already defined by 3GPP (please refer to background section), a UE is usually determining its maximum output power that it is allowed to use for its uplink transmissions based on its powerclass and a maximum power limit configured and signaled by the eNB, i.e., $P_{EMAX}$. $P_{EMAX}$ is determined by the (M)eNB, and the UE is provided with same; the UE in turn possibly applies further power restrictions such as MPR, A-MPR to lower its maximum transmission power in order to be able to meet the requirements on signal quality, spectrum emission mask and spurious emissions.

When a UE, which is connected to an MeNB, enters dual connectivity state, i.e., when a cell controlled by a SeNB is configured and added, it is advantageous according to the present disclosure to determine an initial power distribution of the available output power of a UE for uplink transmissions among the MeNB and SeNB, i.e., determine two parameters $P_{EMAX,MeNB}$ and $P_{EMAX,SeNB}$. $P_{EMAX,MeNB}$ shall be understood as the maximum output power that the mobile station shall use for uplink transmissions to the MeNB; correspondingly, $P_{EMAX,SeNB}$ shall be understood as the maximum output power that the mobile station shall use for uplink transmissions to the SeNB. On a more general level, the MeNB may determine the maximum power the mobile station is permitted to transmit in each UL component carrier or cell or set of configured UL component carrier that belong to the same or different eNB. For the case that one eNB—may it MeNB and SeNB—has more component carrier under its control, the corresponding NodeB could further distribute the signaled maximum allowed uplink transmission power ($P_{EMAX,MeNB}$ and $P_{EMAX,SeNB}$) among the component carriers.

In order to determine an efficient and reasonable initial power distribution ratio, i.e., the two parameters $P_{EMAX,MeNB}$ and $P_{EMAX,SeNB}$, the MeNB can take into account one or various of the following parameters:

the pathloss on the two radio links between the UE and the MeNB/SeNB, which gives an indication of how far the UE is away from the MeNB respectively SeNB (UE-distance to MeNB and SeNB) and thus allowing conclusions on how much power might be necessary by the UE for data transmissions to the MeNB and SeNB and the possible power distribution ratio which is best information on the traffic load handled by MeNB and SeNB uplink resource availability for the two radio links As a result, the MeNB determines how the maximum allowed uplink transmission power is distributed between the UE for uplink transmissions to MeNB and SeNB, i.e., the MeNB determines the values of $P_{EMAX,MeNB}$ and $P_{EMAX,SeNB}$. For example, for a mobile terminal with a maximum transmission power of 23 dBm, communicating with an MeNB and SeNB, the maximum allowed uplink transmission powers may be set to 20 dBm for each eNB. Another example would be to set the power distribution ratio to 1 to 2, where $P_{EMAX,MeNB} = P_{CMAX}/3$ and $P_{CMAX,SeNB} = 2*P_{CMAX}/3$. It should be generally understood that $P_{CMAX}$ refers to the maximum uplink transmission power available by the UE. As MeNB doesn't exactly know the $P_{CMAX}$ set by the mobile station, MeNB would need to either do some prediction of the value or assume always the worst case situation where the mobile station applies the largest power reduction allowed by the specification, i.e., MPR, which would be equal to assume $P_{CMAX\_L}$ as $P_{CMAX}$.

After the determination of the initial values of $P_{EMAX,MeNB}$ and $P_{EMAX,SeNB}$ by the MeNB, these parameters are to be distributed to the SeNB and UE for use in the respective power control procedures. In particular, the UE needs both $P_{EMAX,MeNB}$ and $P_{EMAX,SeNB}$ to properly control the output power for uplink transmissions to both base stations, MeNB and SeNB. The SeNB however only needs the parameter $P_{EMAX,SeNB}$.

Figure 18:
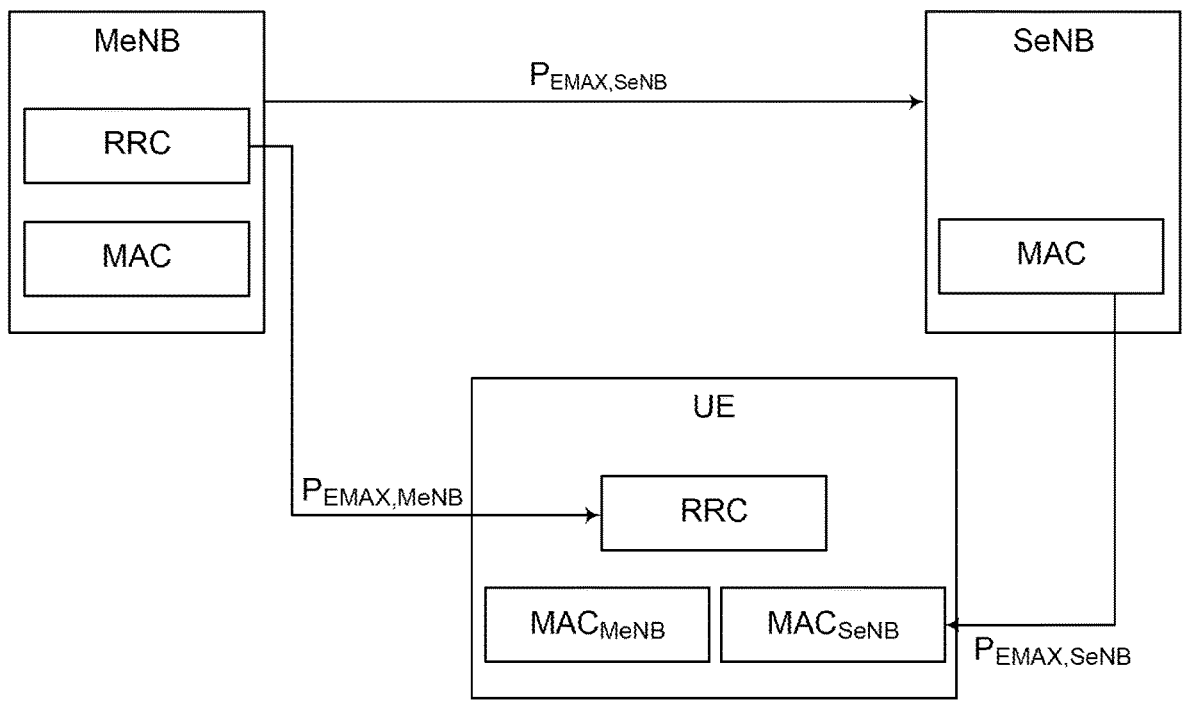
FIG. 18 illustrates the exchange of initial values of power parameters $P_{EMAX,MeNB}$ and $P_{EMAX,SeNB}$ to from the MeNB to the SeNB and UE, according to another alternative implementation.
Figures 19, 20:
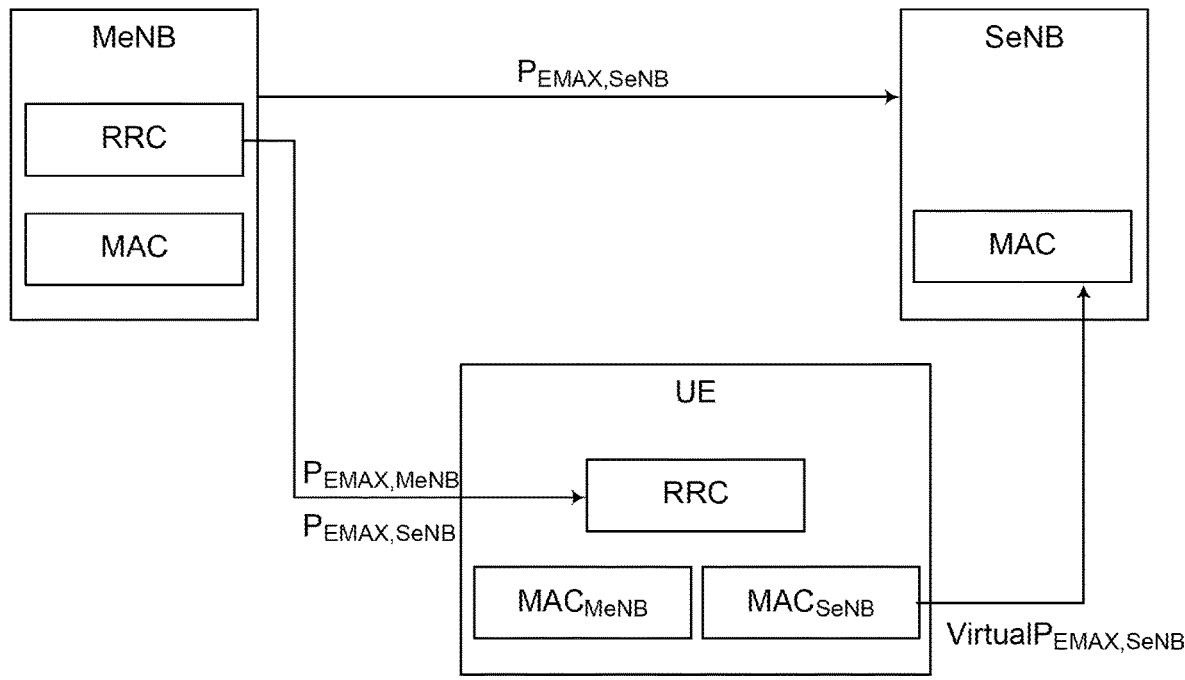
FIG. 19 illustrates the exchange of initial values of power parameters $P_{EMAX,MeNB}$ and $P_{EMAX,SeNB}$ to from the MeNB to the SeNB and UE, according to still another alternative implementation.
FIG. 20 illustrates the structure of a MAC CE for a power headroom report according to one implementation of the present disclosure used for informing the SeNB about the virtual $P_{CMAX,SeNB}$ which is identical as the $P_{EMAX,SeNB}$, where the extended power headroom report for the secondary radio link is supplemented with a virtual power headroom report for the secondary report link and with the virtual $P_{CMAX,SeNB}$.

FIGS. 17-19 illustrate different implementations as to how exactly the two parameters $P_{EMAX,MeNB}$ and $P_{EMAX,SeNB}$ can be distributed from the MeNB, so as to be received by the SeNB and the UE. According to the first alternative as illustrated by FIG. 17, the MeNB can transmit $P_{EMAX,MeNB}$ and $P_{EMAX,SeNB}$ to the UE, and $P_{EMAX,SeNB}$ to the SeNB. Furthermore, in this particular scenario of FIG. 17, the parameters $P_{EMAX,MeNB}$ and $P_{EMAX,SeNB}$ are transmitted via RRC signaling, i.e., as an RRC configuration. Alternatively, but not shown in FIG. 17, the two parameters $P_{EMAX,MeNB}$ and $P_{EMAX,SeNB}$ can also be transmitted from the MeNB to the UE as a MAC control element. Furthermore, the parameter $P_{EMAX,SeNB}$ is preferably transmitted from the MeNB to the SeNB over the Xn interface.

According to another alternative implementation, as depicted in FIG. 18, the parameter $P_{EMAX,SeNB}$ is transmitted from the MeNB to the SeNB, in the same manner as for FIG. 17; i.e., preferably over the Xn interface. However, it is the SeNB, not the MeNB, which transmits the parameter $P_{EMAX,SeNB}$ to the UE; this may be done by use of a MAC control element as depicted in FIG. 18. The MeNB transmits the parameter $P_{EMAX,MeNB}$ to the UE, e.g., as part of a RRC configuration or alternatively (not shown in FIG. 18) in a MAC control element.

According to still another implementation, as depicted in FIG. 19, the MeNB transmits $P_{EMAX,MeNB}$ and $P_{EMAX,SeNB}$ to the UE. Then, contrary to the implementations of FIGS. 17 and 18, the MeNB does not need to transmit $P_{EMAX,SeNB}$ to the SeNB, since this is done by the UE as follows. The UE can transmit $P_{EMAX,SeNB}$ to the SeNB in several ways. Not depicted in FIG. 19 is the simple way that the UE, after receiving the $P_{EMAX,SeNB}$ from the MeNB, forwards this parameter directly further to the SeNB, e.g., within a particular MAC control element. Alternatively, the UE may calculate the power related parameter, virtual $P_{CMAX,SeNB}$ (which is the maximum power used for the calculation of the virtual power headroom), based on the received $P_{EMAX,SeNB}$. Basically, according to a virtual power headroom report, $P_{CMAX,SeNB}$ is equal to $P_{CMAX\_H,c}$ which is equal to $P_{EMAX,SeNB}$. Therefore, the UE can transmit the virtual $P_{CMAX,SeNB}$ to the SeNB, as depicted in FIG. 19. According to another implementation, the UE after calculating the virtual $P_{CMAX,SeNB}$, as explained above, also calculates the virtual power headroom report for the secondary link (V-PHRSeNB) and transmits both together to the SeNB. One way of transmitting these two parameters V-PHRseNB and virtual $P_{CMAX,SeNB}$ together to the SeNB is depicted in FIG. 20, which illustrates the structure of a MAC control element for a power headroom report, including an extended power headroom report for the secondary radio link to the SeNB ($2^{nd}$ to $5^{th}$ line; see also corresponding part of background section regarding extended PHR, Type 2 vs Type 1, with additional $P_{CMAX,c}$, etc.) and further includes the virtual power headroom value and the corresponding $P_{CMAX,SeNB}$ which is usually not transmitted with the virtual PHR.

As explained above exemplarily in relation to FIGS. 17 to 19, the SeNB and the UE are provided with the necessary parameters, $P_{EMAX,MeNB}$ and $P_{EMAX,SeNB}$, so as to apply same to the usual power control procedure as already standardized by 3GPP, which means that the UE proceeds to calculate its $P_{CMAX,SeNB}$ and $P_{CMAX,MeNB}$ to be used for uplink transmissions scheduled by the MeNB and the SeNB (possibly applying further a power reduction as needed).

Accordingly, by one of the various alternatives it is possible to distribute the parameters $P_{EMAX,SeNB}$ and $P_{EMAX,MeNB}$ from the MeNB to the SeNB and UE. These same alternatives can also be used later in connection with further improvements where updated values of these parameters are to be distributed accordingly to the SeNB and/or the UE.

In the above, basically the initialization of the power distribution between MeNB and SeNB has been explained, where initial values for the parameters $P_{EMAX,SeNB}$ and $P_{EMAX,MeNB}$ are determined by the MeNB (responsible for the power distribution control) and then transmitted to the SeNB and UE so as to apply them to the uplink scheduling respectively uplink transmissions. In the following, the further operation will be explained, according to which the initially-configured power distribution can be updated so as to maintain an efficient power distribution ratio between uplink transmissions from the UE to the MeNB and to the SeNB. Again, the MeNB is assumed to be responsible for updating the power distribution as needed, i.e., to determine updated values for the parameters $P_{EMAX,SeNB}$ and $P_{EMAX,MeNB}$ and to distribute same to the SeNB and/or the UE as needed (according to one of the various alternatives presented above).

To said end, the MeNB shall use e.g., information on the pathloss on at least one of the two radio links, or information on the traffic load; in line with the determination of the initial power distribution. While the MeNB may already have some of the information, such as the traffic load for both radio links (e.g., in cases where the MeNB forwards the SeNB data to the SeNB), the MeNB is to be provided with other information which he would normally not have access to.

In particular, the MeNB can determine the information on the pathloss of the first radio link between the UE and the MeNB, from (extended) power headroom reports received from the UE for the first radio link. As can be seen from the equations for the power headroom value, as set out in the background section and as defined by the current standardization, the information on the pathloss (PL) is one of various parameters that are used by the UE to calculate the power headroom value provided to the MeNB, and the MeNB knowing most of the remaining parameters of the equation can derive information on the pathloss, as determined by the UE. In addition to the power headroom reports, the MeNB can use the mobility measurement reports such as RSRP (Reference Signal Received Power) and RSRQ (Reference Signal Received Quality) in order to retrieve the pathloss information for the first radio link.

On the other hand, the MeNB is not aware of the pathloss determined by the UE for the secondary radio link between the UE and the SeNB, which however is also important for the updating of the power distribution ratio. The information on the pathloss can be provided in several ways to the MeNB.

Of course, the information on the pathloss can be provided directly from the UE to the MeNB, e.g., in a corresponding MAC control element or other appropriate message.

Alternatively, the UE can calculate and prepare a virtual power headroom report, including a virtual power headroom value, for the secondary radio link to the SeNB. The definition of the V-PHR according to 3GPP (see background section for details) is such that the MeNB receiving the value of $PH_{virtual}$, from the UE can derive the information on the pathloss therefrom. This is in contrast to the normal power headroom report, which power headroom value is calculated by the UE based on a resource assignment unknown to the MeNB (i.e., $M_{PUSCH}(i)$ which is the bandwidth of the PUSCH resource assignment expressed in number of resource blocks valid for sub-frame i). For this reason, the MeNB cannot derive the pathloss information therefrom. As outlined in the technical background section, the virtual PH is according to 3GPP TS36.213 calculated as $$PH_{virtual,c}(i)=P_{CMAX,H,c}-\{P_{0\_PUSCH}(j)+a(j)+PL_c+f(i)\}$$

The parameter f(i) represents the UE-specific TPC commands, which can be configured either in a accumulative or absolute fashion. Since the MeNB does not know the TPC commands sent by SeNB, in an further alternative embodiment the f(i) could be set to zero for the calculation of the virtual power headroom value for the secondary link.

The V-PHR for the secondary radio link can be provided to the MeNB, which in turn can derive the information on the pathloss therefrom. For example, the usual power headroom reporting could be adapted such that the UE transmits the V-PHR for the secondary radio link together with the usual power headroom report to the MeNB. This is apparent from FIG. 22, which illustrates the MAC control element for the $PHR_{MeNB}$ and Virtual $PHR_{SeNB}$.

Figures 21, 22:
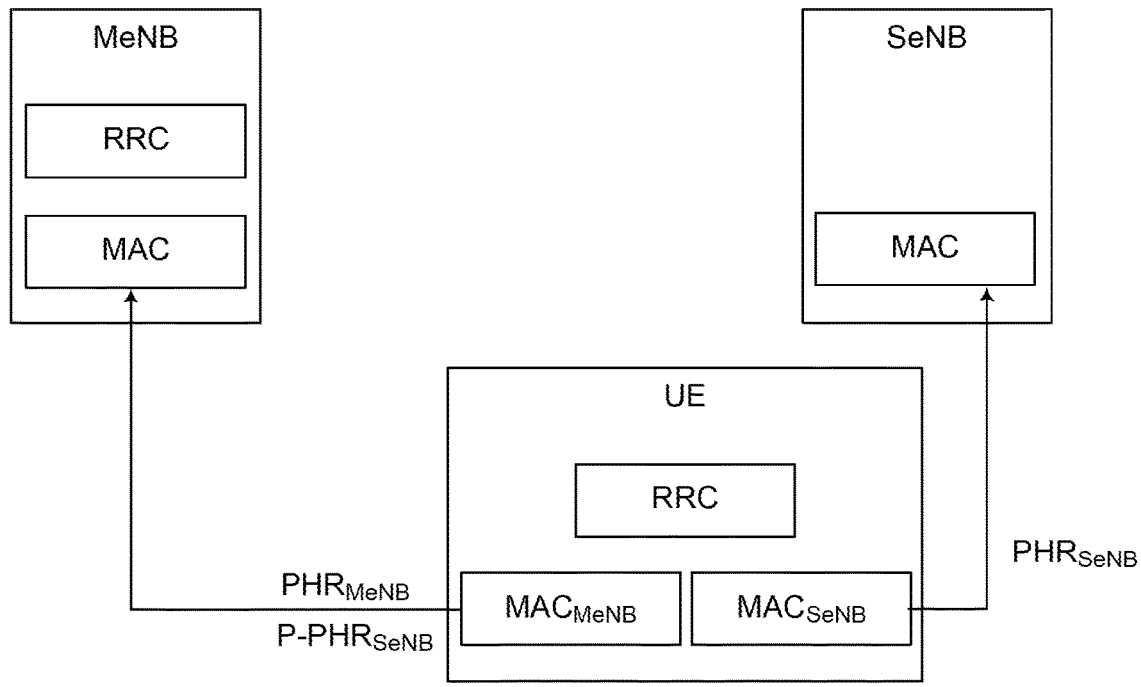
FIG. 21 illustrates the adapted power headroom reporting as performed by the UE according to an implementation of the present disclosure, where an extended power headroom report for the secondary radio link is transmitted to the SeNB, and the extended power headroom report for the first radio link is supplemented with a virtual power headroom report for the secondary radio link so as to inform the MeNB about the pathloss of the secondary radio link.
FIG. 22 illustrates the structure of a MAC CE for a power headroom report according to one implementation of the present disclosure, which can be used in connected with the PHR exchange of FIG. 21, namely including the extended power headroom report for the first radio link and a virtual power headroom report for the secondary radio link.
Figure 23:
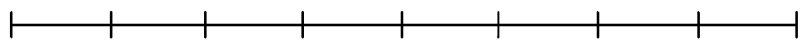
FIG. 23 illustrates the structure of a MAC CE for a power headroom report for the secondary radio link, which can be used in connection with the PHR exchange of FIG. 21, namely including the extended power headroom report the for the secondary radio link.

This changes the usual power headroom reporting such that the UE not only prepares power headroom reports for the first and secondary radio links and transmits them respectively to the MeNB and SeNB, as already defined by the 3GPP standard (see e.g., FIG. 23 for the usual power headroom report). Additionally, the UE prepares a virtual power headroom report for the secondary radio link, which is then transmitted by the UE to the MeNB (not to the SeNB) (preferably together with the usual power headroom report for the first radio link). As shown in FIG. 22 the virtual power headroom for the SeNB should be basically a type 1 PH. However it would be also possible to include a virtual type 2 Power headroom, i.e., based a reference PUCCH format. The virtual PH would be according to FIG. 22 always appended at the end of the usual power headroom report for the MeNB link.

According to another embodiment the virtual power headroom information is provided together with in identifier of the SeNB. This is in particular necessary for deployments where UE is connected to one MeNB and more than one SeNB. The reserved bit "R" and the "V" could be for example used to signal the identifier.

In a further alternative embodiment the virtual PHR info is transmitted in a separate power headroom MAC control element, which is identified by a predefined identifier, e.g., logical channel ID. The format of this secondary power headroom report could be similar to power headroom MAC control element or extended power headroom MAC control element defined in TS36.321.

Correspondingly, in one specific implementation, the standard power headroom reporting could be changed such that every time a PHR for the MeNB is triggered (e.g., due to a periodic reporting or due to an event-triggered reporting like a significant pathloss change), the UE shall always sent the normal PHR for the MeNB together with the virtual PHR for the SeNB to the MeNB.

In summary, the MeNB shall receive the necessary information allowing it to update the power distribution, preferably on a regular basis. This includes the determination of updated values for the parameters $P_{EMAX,SeNB}$ and $P_{EMAX,MeNB}$ and the distribution of same to the SeNB and/or the UE as needed (e.g., according to one of the various alternatives presented above and explained in connection with FIGS. 17-19).

In the above, the update of the power distribution ratio has been explained for scenarios in which the power distribution ratio may change due to e.g., movement of the UE where the pathloss changes and thus the update of the power distribution ratio is advantageous. However, the power distribution ratio shall also be updated for other situations, such as when a particular radio link (e.g., the first or second radio link) is not used in the uplink, or is not usable. In more detail, a radio link may become inactive in the uplink for several reasons. For instance, when the UE expects to not receive any downlink data (including any uplink resource assignments) for a particular length of time, it may enter a DRX state so as to save battery (see also corresponding background chapter on DRX).

Another example is when there is a radio link failure for a radio link (at least for the uplink), i.e., a radio link fails, is not usable any more for uplink transmissions, and thus enters a radio link failure state. In at least the above two cases, no uplink transmissions are done/possible for one of the two radio links, such that the power distribution ratio is not efficient, since the power assigned to uplink transmissions over the unused/broken radio link is wasted, and shall better be used for uplink transmissions over the other remaining used/non-broken radio link. A further improvement of the present disclosure to achieve this will be explained in the following.

First the case will be explained where the radio link becomes inactive for the uplink. The UE is monitoring the uplink transmissions over the two radio links and thus is able to determine when the radio link becomes inactive for the uplink, i.e., when no uplink transmissions are expected to be transmitted from the UE to the MeNB or SeNB. As already noted above, this may be the case when the UE enters DRX mode.

In a more preferable solution, to avoid that lengths of inactivity, that are too short, trigger the re-configuration of the power distribution ratio, the UE may also determine the expected length of the inactivity for the radio link, and may only proceed with the present disclosure (as explained below), when the expected length of radio link inactivity for uplink exceeds a certain time threshold; e.g., the threshold can be pre-determined and configured by the MeNB via RRC.

In any case, the UE which is monitoring the possible inactivity of the two radio links for uplink transmission to MeNB/SeNB, will eventually determine that one of the two radio links indeed becomes inactive.

Assuming that the UE determines that the first radio link to the MeNB becomes inactive for the uplink (preferably for a length in time longer than the pre-determined time threshold), then, the SeNB shall be informed in said respect, i.e., about the first radio link becoming inactive in the uplink. Similarly, when the UE determines that the secondary radio link to the SeNB becomes inactive for the uplink (preferably for a length in time longer than the pre-determined threshold), then, the MeNB shall be informed in said respect, i.e., about the secondary radio link becoming inactive in the uplink.

The UE may inform the SeNB/MeNB, about the inactivity of the respective radio link to the other eNB (i.e., MeNB/SeNB), in at least one of the following ways.

The UE can use these situations as a trigger for power headroom reporting, and thus prepare a power headroom report in which a corresponding pre-determined flag is set to a pre-determined value (such as "1"), which can be then understood by the receiving base station that the radio link becomes inactive for the uplink. In more detail, for the case of the first radio link to the MeNB becoming inactive, the UE prepares a power headroom report for the secondary radio link to the SeNB, and sets a flag in said prepared secondary power headroom report (e.g., one of the reserved flags "R" or one of the V-flags in the PHR MAC CE of FIG. 23). Alternatively, the UE prepares a virtual power headroom report for the secondary radio link to the SeNB, and sets a flag in said secondary virtual power headroom report (e.g., one of the R-flags in the last two lines of the PHR MAC CE as illustrates in FIG. 20). According to still another alternative, the UE prepares a virtual power headroom report for the secondary radio link to the SeNB and sets the virtual power headroom value of the secondary virtual power headroom report to a particular pre-determined value (e.g., to a negative value; a usual V-PH cannot be negative). In any case, the SeNB receives from the UE one of the above-noted indications (i.e., flags or pre-determined V-PH value) and can derive therefrom that the first radio link is inactive for the uplink.

Conversely, for the case where the secondary radio link to the SeNB becomes inactive, the UE prepares a power headroom report for the first radio link to the MeNB, and sets a flag in said prepared first power headroom report (e.g., one of the reserved flags "R" or one of the V-flags in the PHR MAC CE as depicted in the first 5 lines of FIG. 22). Alternatively, the UE prepares a virtual power headroom report for the secondary radio link between the UE and the SeNB (which is also used for providing the MeNB with information on the pathloss of the secondary radio link, as explained above) and sets a flag in said secondary virtual power headroom report (e.g., the R- or V-flag in the last line of the PHR MAC CE as illustrated in FIG. 22). According to still another alternative, the UE prepares a virtual power headroom report for the secondary radio link between the UE and the SeNB, and sets the virtual power headroom value of the secondary virtual power headroom report to a particular pre-determined value (e.g., to a negative value); please note that in this case, the secondary virtual power headroom value does not allow the MeNB to derive the information on the pathloss thereof. In any case, the MeNB receives from the UE one of the above-noted indications (i.e., flags or pre-determined V-PH value) and can derive therefrom that the secondary radio link is inactive for the uplink.

In summary, the UE thus informs the SeNB/MeNB in one way or another, about the inactivity of the respective radio link to the other eNB (i.e., MeNB/SeNB). The SeNB/MeNB can then use the received indication to update the power distribution ratio such that all the output power for uplink transmissions by the UE is assigned to the uplink transmissions over the radio link that remains "active"; i.e., the SeNB, when being informed about the first radio link to the MeNB becoming inactive for the uplink, determines a new value for $P_{EMAX,SeNB}$, with $P_{EMAX,SeNB}=P_{CMAX}$ (or $P_{CMAX\_L}$), and transmits same to the UE (e.g., in a MAC CE), such that the UE applies this new value for the uplink transmissions to the SeNB. Similarly, the MeNB, when being informed about the secondary radio link to the SeNB becoming inactive for the uplink, determines a new value for $P_{EMAX,MeNB}$, With $P_{EMAX,MeNB}=P_{CMAX}$ (or $P_{CMAX\_L}$), and transmits same to the UE (e.g., in a MAC CE), such that the UE applies this new value for the uplink transmissions to the MeNB.

However, since those inactivities of radio links are usually of a temporary nature, the power distribution ratio has to be eventually restored to the previous ratio. To said end, the UE of course could again inform the MeNB/SeNB about the respective radio link to the other eNB (i.e., SeNB/MeNB) becoming active again, so as to trigger another re-configuration of the power distribution ratio, in a similar manner as just explained above.

According to another improvement of the present disclosure however, this second informing step of the UE, when a radio becomes active for the uplink again, is avoided by the use of a corresponding timer in the SeNB/MeNB. In more detail, the re-configuration of the power distribution ratio shall be only valid for a particular length of time, as configured by a power control timer, implemented in the SeNB and MeNB to said end. After expiry of said power control timer, the power distribution before the re-configuration shall be applied again. In detail, a power control timer is implemented in the SeNB and MeNB, which is respectively triggered, when the SeNB/MeNB receives the indication about the radio link becoming inactive and the SeNB/MeNB calculates the new updated value of the power output and sends it to the UE. Upon expiry of the power control timer, the SeNB/MeNB returns the power distribution ratio to the ratio as applied before the re-configuration, and sends the thus-restored power parameter $P_{EMAX,SeNB}$/$P_{EMAX,MeNB}$ to the UE again.

The value of the power control timer can be either pre-configured; or even more preferably may be instructed by the UE. Particularly, when the UE determines that a radio link becomes inactive for the uplink, the UE may also determine the expected length of time the radio link is expected to be inactive for the uplink. Then, the UE informs the SeNB respectively MeNB about the expected length of inactivity time, where the SeNB and MeNB can use this information to configure its power control timer. According to one advantageous implementation, the UE can encode the expected length of inactivity time into the virtual power headroom value of the secondary virtual power headroom report; e.g., the virtual power headroom value not only encodes that the first/secondary radio link becomes inactive (e.g., by using a negative virtual power headroom value), but would also encode the expected length of time of the inactivity (e.g., by use of different particular negative virtual power headroom values).

Correspondingly, as explained above, when a radio link becomes inactive for the uplink, the UE power distribution is re-configured such that the UE can use its full UE power resource for the other still-active radio link.

In a similar manner, situations are dealt with where a radio link breaks, i.e., where the radio link is not usable any more for uplink (and downlink) transmissions. The UE monitors the radio links for failure, and thus eventually will determine the radio link failure of one of the two radio links. Correspondingly, the UE shall inform the respective other eNB about the radio link failure; i.e., the UE shall inform the MeNB in case of a radio link failure of the secondary radio link to the SeNB; and the UE shall inform the SeNB in case of a radio link failure of the first radio link to the MeNB.

The UE may inform the SeNB/MeNB about the radio link failure of the first/secondary radio link e.g., in a similar manner as done for the above-discussed cases of radio link inactivity for the uplink. In order to avoid unnecessary repetition, please refer the above explanations on how the different R- or V-flags of the various (virtual) power headroom reports or the (negative) virtual power headroom values could be re-used in said respect.

In summary, the UE informs the SeNB/MeNB in one way or another about the radio link failure of the respective radio link. The SeNB/MeNB can then use the received indication to update the power distribution ratio such that all the output power for uplink transmissions by the UE is assigned to uplink transmissions over the functioning radio link. In detail, the SeNB, when being informed about the radio link failure of the first radio link, determines a new value for $P_{EMAX,SeNB}$, with $P_{EMAX,SeNB}=P_{CMAX}$ (or $P_{CMAX\_L}$), and transmits same to the UE (e.g., in a MAC CE), such that the UE applies this new value for the uplink transmissions to the SeNB. Conversely, the MeNB, when being informed about the radio link failure of the secondary radio link, determines a new value for $P_{EMAX,MeNB}$, With $P_{EMAX,MeNB}=P_{CMAX}$ (or $P_{CMAX\_L}$), and transmits same to the UE (e.g., in a MAC CE), such that the UE applies this new value for the uplink transmissions to the MeNB.

Furthermore, the SeNB/MeNB, when receiving the indication from the UE, about a radio link failure, can initiate appropriate procedures to solve the radio link failure. For instance, when the MeNB learns about the radio link failure of the secondary radio link, it may change the radio bearers, which were going via the SeNB, to go via the MeNB, or it may determine another SeNB for the UE to connect to. Details of these procedures are already known in the prior art and thus known to the skilled person, and are thus omitted from this description.

On the other hand, when the SeNB learns about the radio link failure of the first radio link, it may perform a reconfiguration or handover such that the SeNB becomes the new MeNB. Details of this procedure are already known in the prior art and thus known to the skilled person, and are thus omitted from this description. Depending on whether and how the radio link failure is solved, the power distribution ratio may be updated again at a later point in time, new parameters $P_{EMAX,SeNB}$, and/or $P_{EMAX,MeNB}$, shall be determined and then provided again to the UE and/or MeNB/SeNB for appropriately configuring the power distribution of the UE.

Hardware and Software Implementation

Another embodiment of the present disclosure relates to the implementation of the above described various embodiments using hardware and software, or hardware only. In this connection the present disclosure provides a user equipment (mobile terminal) and a master and secondary eNodeB (base station). The user equipment and base station are adapted to perform the methods described herein.

It is further recognized that the various embodiments of the present disclosure may be implemented or performed using computing devices (processors). A computing device or processor may for example be general purpose processors, digital signal processors (DSP), application specific integrated circuits (ASIC), field programmable gate arrays (FPGA) or other programmable logic devices, etc. In addition, radio transmitter and radio receiver and other necessary hardware may be provided in the apparatuses (UE, MeNB, SeNB). The various embodiments of the present disclosure may also be performed or embodied by a combination of these devices.

Further, the various embodiments of the present disclosure may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the present disclosure may individually or in arbitrary combination be subject matter to another embodiment.

It would be appreciated by a person skilled in the art that numerous variations and/or modifications may be made to the present disclosure as shown in the specific embodiments without departing from the spirit or scope of the present disclosure as broadly described. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit for controlling a master base station for power headroom reporting in a wireless communication system, the integrated circuit comprising:
  control circuitry, which, in operation,
    establishes a dual connectivity with a user equipment, which connects with both the master base station via a first radio link and a secondary base station via a secondary radio link, and
    configures the user equipment to:
      generate a power headroom report including a first power headroom report for the first radio link, using a first Media Access Control (MAC) entity which handles MAC functionalities and protocol towards the master base station, and
      calculate a virtual power headroom report for an activated serving cell of the secondary radio link based on a virtual uplink resource assignment for the secondary radio link, in response to a virtual power headroom calculation being configured; and
  receiving circuitry, which, in operation, receives the power headroom report including at least the first power headroom report from the user equipment, wherein, in response to the virtual power headroom calculation being configured, the power headroom report always additionally includes the virtual power headroom report for the secondary radio link every time a power headroom reporting for the first radio link is triggered.

2. The integrated circuit according to claim 1, wherein the receiving circuitry, in operation, receives the power headroom report including the first power headroom report and the virtual power headroom report generated in a single MAC Control Element at the user equipment.

3. An integrated circuit comprising circuitry configured to control a process of a master base station, wherein the process includes:

establishing a dual connectivity with a user equipment, which connects with both the master base station via a first radio link and a secondary base station via a secondary radio link;

configuring the user equipment to:
- generate, by the user equipment, a power headroom report including a first power headroom report for the first radio link, using a first Media Access Control (MAC) entity which handles MAC functionalities and protocol towards the master base station;
- calculate, by the user equipment, a virtual power headroom report for an activated serving cell of the secondary radio link based on a virtual uplink resource assignment for the secondary radio link, in response to a virtual power headroom calculation being configured; and receiving the power headroom report including at least the first power headroom report from the user equipment, wherein, in response to the virtual power headroom calculation being configured, the power headroom report always additionally includes the virtual power headroom report for the secondary radio link every time a power headroom reporting for the first radio link is triggered.

4. The integrated circuit according to claim 3, wherein the power headroom report including the first power headroom report and the virtual power headroom report is generated in a single MAC Control Element at the user equipment.

* * * * *